(12) United States Patent
Hagihara et al.

(10) Patent No.: US 6,999,122 B1
(45) Date of Patent: Feb. 14, 2006

(54) SOLID-STATE LOGARITHMIC IMAGE SENSING DEVICE

(75) Inventors: Yoshio Hagihara, Amagasaki (JP); Kenji Takada, Itami (JP)

(73) Assignee: Minolta Co., Ltd., Osaka (JP)

( * ) Notice: Subject to any disclaimer, the term of this patent is extended or adjusted under 35 U.S.C. 154(b) by 794 days.

(21) Appl. No.: 09/618,326

(22) Filed: Jul. 18, 2000

(30) Foreign Application Priority Data

Jul. 22, 1999 (JP) ............................. H11-207696
Jul. 22, 1999 (JP) ............................. H11-208267

(51) Int. Cl.
*H04N 5/335* (2006.01)
(52) U.S. Cl. ............... 348/308; 348/207.99; 348/301; 250/208.1
(58) Field of Classification Search ............. 348/301, 348/302, 304, 308, 207.99, 294, 300; 250/208.1
See application file for complete search history.

(56) References Cited

U.S. PATENT DOCUMENTS

| 4,973,833 A | 11/1990 | Takada et al. | ............ 250/208.1 |
| 5,241,575 A | 8/1993 | Miyatake et al. | ............. 377/60 |
| 5,363,000 A | 11/1994 | Miyatake et al. | ........... 327/350 |

*Primary Examiner*—Tuan Ho
*Assistant Examiner*—Heather R. Long
(74) *Attorney, Agent, or Firm*—Sidley Austin Brown & Wood LLP

(57) ABSTRACT

In a solid-state image-sensing device, after completion of image sensing by individual pixels, in each pixel, a signal φVRB fed to a capacitor C1 connected to the gate of a first MOS transistor T1 is turned to a high level to make it easy for a negative electric charge to flow into the MOS transistor T1. This permits quick recombination of the positive electric charges accumulated at the drain and gate of the MOS transistor T1, at the gate of a MOS transistor T2, at the anode of a photodiode, and in a capacitor C2, and thereby makes quick resetting possible.

11 Claims, 23 Drawing Sheets

SOLID-STATE LOGARITHMIC IMAGE SENSING DEVICE

This application is based on applications Nos. H11-207696 and H11-208267 both filed in Japan on Jul. 22, 1999, the entire contents of which are hereby incorporated by reference.

BACKGROUND OF THE INVENTION

1. Field of the Invention

The present invention relates to an image-sensing apparatus, and particularly to an image-sensing apparatus incorporating a solid-state image-sensing device having a plurality of pixels arranged therein.

2. Description of the Prior Art

Solid-state image-sensing devices designed for use in image-sensing apparatuses are not only small-sized, lightweight, and power-saving, but also free from image distortion, free from image burn-in, and resistant to unfavorable environmental conditions such as vibration and electric fields. Moreover, such image-sensing devices can be manufactured by a process common or analogous to one used to manufacture LSIs (large-scale integrated circuits), and therefore they are reliable and fit for mass production. For these reasons, solid-state image-sensing devices having pixels arranged in a line are widely used in facsimile machines, flat-bed scanners, and the like, and solid-state image-sensing devices having pixels arranged in a matrix are widely used in video cameras, digital cameras, and the like. Solid-state image-sensing devices are roughly grouped into two types according to the means they use to read out (extract) the photoelectric charges generated in their photoelectric conversion devices, namely a CCD type and a MOS type. A CCD-type image-sensing device accumulates photoelectric charges in potential wells while transferring them, and has the disadvantage of a comparatively narrow dynamic range. On the other hand, a MOS-type image-sensing device reads out electric charges accumulated in the pn-junction capacitances of photodiodes through MOS transistors.

Now, how each pixel is configured in a conventional MOS-type solid-state image-sensing device will be described with reference to FIG. 37. As shown in this figure, a photodiode PD has its cathode connected to the gate of a MOS transistor T101 and to the source of a MOS transistor T102. The MOS transistor T101 has its source connected to the drain of a MOS transistor T103, and this MOS transistor T103 has its source connected to an output signal line VOUT. A direct-current voltage VPD is applied to the drain of the MOS transistor T101 and to the drain of the MOS transistor T102, and a direct-current voltage VPS is applied to the anode of the photodiode.

When light enters the photodiode PD, a photoelectric charge is generated therein, and this electric charge is accumulated at the gate of the MOS transistor T101. Here, when a pulse signal $\phi V$ is fed to the gate of the MOS transistor T103 to turn this MOS transistor T103 on, a current proportional to the electric charge accumulated at the gate of the MOS transistor T101 flows through the MOS transistors T101 and T103 to the output signal line. In this way, it is possible to read an output current that is proportional to the amount of incident light. After this signal has been read, the MOS transistor T103 is turned off and thereby the MOS transistor T102 is turned on so that the gate voltage of the MOS transistor T101 will be initialized.

As described above, in a conventional MOS-type solid-state image-sensing device, at each pixel, the photoelectric charge generated in the photodiode PD and then accumulated at the gate of the MOS transistor T101 is directly read out. This, however, leads to a narrow dynamic range and thus demands accurate control of the amount of exposure. Moreover, even if the amount of exposure is controlled accurately, the obtained image tends to suffer from flat blackness in dim portions thereof and saturation in bright portions thereof.

On the other hand, the assignee of the present invention has once proposed a solid-state image-sensing device including a light-sensing means that generates a photoelectric current in accordance with the amount of incident light, a MOS transistor to which the generated photoelectric current is fed, and a bias-supplying means that supplies a bias to the MOS transistor to bring it into a state in which a subthreshold current flows therethrough so that the photoelectric current is subjected to logarithmic conversion (refer to U.S. Pat. No. 5,241,575).

In this solid-state image-sensing device, when the individual pixels are reset to their original state after image sensing, except in a low-brightness region, a current (called a reset current) having the opposite polarity to the photoelectric current readily flows into the MOS transistor. Therefore, it is easy for the photoelectric charge accumulated in the MOS transistor to recombine with the reset current, and thus resetting is achieved quickly. However, in a low-brightness region, under the influence of the threshold voltage of the MOS transistor, the reset current has difficulty in flowing into the MOS transistor. Therefore, it is difficult for the photoelectric charge accumulated in the MOS transistor to recombine with the reset current, and thus resetting takes an unduly long time. In this way, in a low-brightness region, the individual pixels exhibit poor response, and this causes an after-image to appear in immediately subsequent image sensing.

SUMMARY OF THE INVENTION

An object of the present invention is to provide an image-sensing apparatus that permits shooting of a subject having a wide brightness range, ranging from a high-brightness region to a low-brightness region, with high resolution and that permits individual pixels to be reset to their original state quickly even in a low-brightness region and thereby offers quick response.

To achieve the above object, according to one aspect of the present invention, an image-sensing apparatus is provided with a photoelectric conversion portion having a photosensitive element producing an electric signal in accordance with amount of incident light and a first transistor having a first electrode connected to the photosensitive element, a second electrode, and a control electrode. This photoelectric conversion portion outputs the electric signal output from the photosensitive element and converted natural-logarithmically by making the first transistor operate in a subthreshold region. The image-sensing apparatus is further provided with a lead-out path for feeding the electric signal output from the photoelectric conversion portion to an output signal line and a controller for resetting the potential in the first transistor by switching the voltage applied to the control electrode of the first transistor.

BRIEF DESCRIPTION OF THE DRAWINGS

This and other objects and features of the present invention will become clear from the following description, taken in conjunction with the preferred embodiments with reference to the accompanying drawings in which.

DESCRIPTION OF THE PREFERRED EMBODIMENTS

Image-Sensing Apparatus

Figure 1:
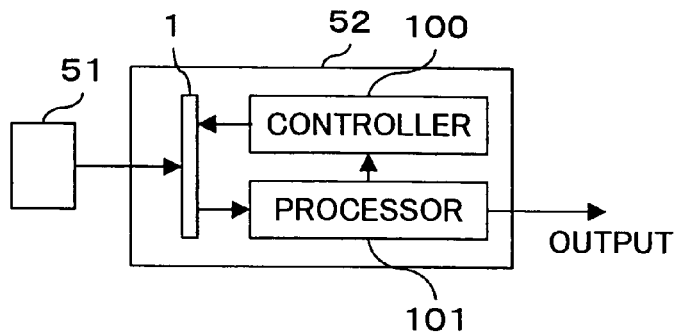
FIG. 1 is a block diagram showing the internal configuration of an image-sensing apparatus according to the invention.

First, an image-sensing apparatus according to the present invention will be described with reference to the drawings. FIG. 1 is a block diagram showing the internal configuration of an image-sensing apparatus according to the invention. The image-sensing apparatus 52 shown in FIG. 1 includes the following components. A solid-state image-sensing device 1 receives the light from a subject through an objective lens 51. A controller 100 controls the operation of the solid-state image-sensing device 1. A processor 101 processes the signal output from the solid-state image-sensing device 1.

In this image-sensing apparatus 52 configured as described above, the controller 100, by switching the voltage of a signal φVPS or φVRB, described later, fed to the individual pixels provided in the solid-state image-sensing device 1, switches the operation of the individual pixels between image sensing and resetting. Moreover, the controller 100, by feeding a pulse signal φV to the individual pixels, makes them feed the electric signals obtained as a result of photoelectric conversion to the processor 101. The electric signal thus fed to the processor 101 is processed by the processor 101 and is then fed to the succeeding circuit.

In addition, in a sixth, seventh, sixteenth, and seventeenth embodiment described later, the solid-state image-sensing device 1 is controlled by the controller 100 by being fed with various signals as mentioned above. The output of the solid-state image-sensing device 1 is fed to the processor 101, and the processor 101 checks, on the basis of the timing with which the output is yielded, whether the output is image data or compensation data, and then outputs it to the succeeding stage. At this time, to permit the controller 100 to recognize whether the signal currently being fed to the succeeding stage is image data or compensation data, the processor 101 feeds the controller 100 with information on the signal it is currently outputting.

The above-described configuration and operation of the image-sensing apparatus are common to all of the descriptions to follow. Now, the solid-state image-sensing device provided in this image-sensing apparatus will be described.

First Example of the Pixel Configuration

Figure 2:
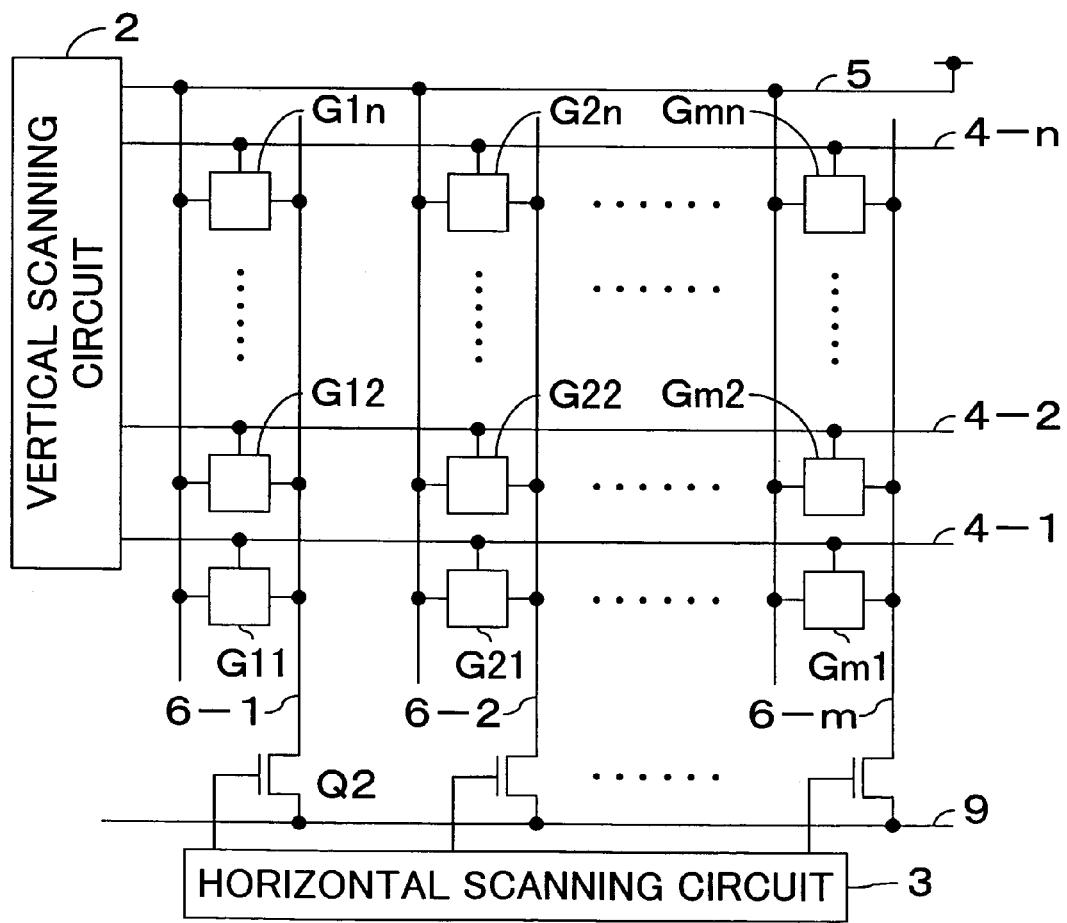
FIG. 2 is a block circuit diagram illustrating the overall configuration of a two-dimensional solid-state image-sensing device embodying the invention.
Figure 3:
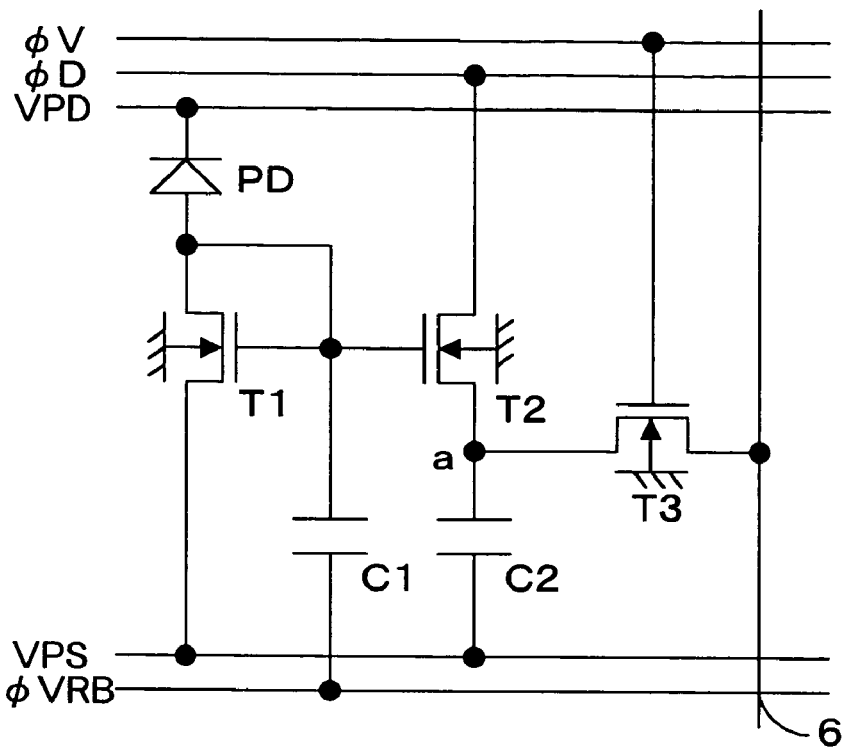
FIG. 3 is a circuit diagram showing the configuration of each pixel in a first embodiment of the invention.
Figure 6:
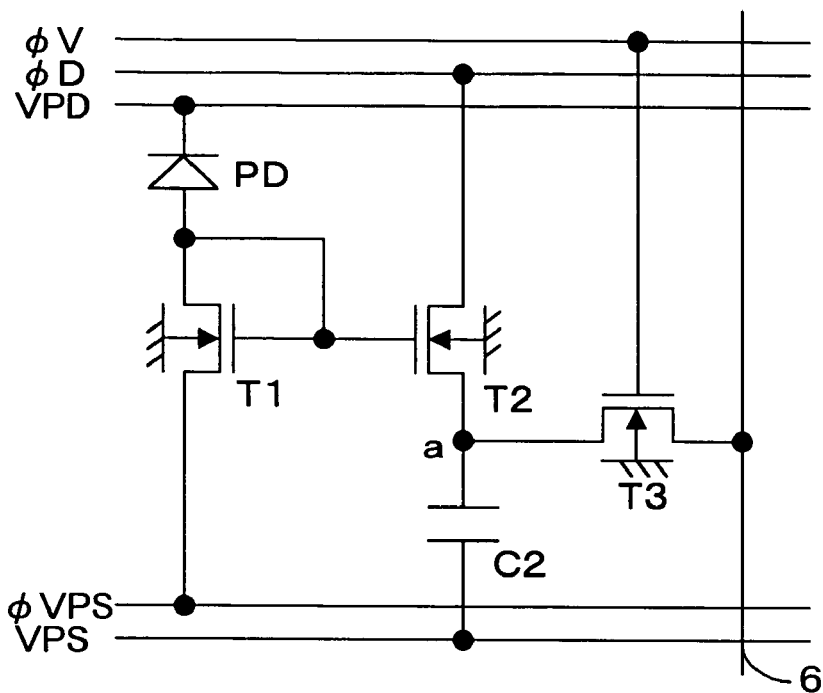
FIG. 6 is a circuit diagram showing the configuration of each pixel in a second embodiment of the invention.

Hereinafter, solid-state image-sensing devices embodying the present invention will be described with reference to the drawings. FIG. 2 schematically shows the configuration of part of a two-dimensional MOS-type solid-state image-sensing device embodying the invention. In this figure, reference symbols G11 to Gmn represent pixels that are arranged in a two-dimensional array (in a matrix). Reference numeral 2 represents a vertical scanning circuit, which scans lines (rows) 4-1, 4-2, . . . , 4-n sequentially. Reference numeral 3 represents a horizontal scanning circuit, which reads out, sequentially pixel by pixel in a horizontal direction, the signals fed from the individual pixels to output signal lines 6-1, 6-2, . . . , 6-m as a result of photoelectric conversion performed in those pixels. Reference numeral 5 represents a power line. The individual pixels are connected not only to the lines 4-1, 4-2, . . . , 4-n, to the output signal lines 6-1, 6-2, . . . , 6-m, and to the power line 5 mentioned above, but also to other lines (for example clock lines and bias supply lines). These other lines, however, are omitted in FIG. 2, and are shown in FIGS. 3 and 6, which show a first and a second embodiment, respectively, of the invention.

As shown in FIG. 2, for each of the output signal lines 6-1, 6-2, . . . , 6-m, one N-channel MOS transistor Q2 is provided. Here, a description will be given only with respect to the output signal line 6-1 as their representative. The MOS transistor Q2 has its drain connected to the output signal line 6-1, has its source connected to a signal line 9 serving as a final destination line, and has its gate connected to the horizontal scanning circuit 3. As will be described later, within each pixel, another N-channel MOS transistor (a third MOS transistor) T3 functioning as a switch is provided. Whereas this MOS transistor T3 serves to select a row, the MOS transistor Q2 serves to select a column.

First Embodiment

Now, a first embodiment (FIG. 3) of the invention, which is applicable to each pixel of the first example of the pixel configuration shown in FIG. 2, will be described with reference to the drawings.

In FIG. 3, a pn photodiode PD serves as a photosensitive element (photoelectric conversion portion). The anode of this photodiode PD is connected to the gate and drain of a first MOS transistor T1, and also to the gate of a second MOS transistor T2. The source of the MOS transistor T2 is connected to the drain of a third MOS transistor T3 for selecting a row. The source of this MOS transistor T3 is connected to the output signal line 6 (this output signal line 6 corresponds to the output signal lines 6-1, 6-2, . . . , 6-m in FIG. 2). The MOS transistors T1 to T3 are all N-channel MOS transistors, and have their back gates grounded.

A direct-current voltage VPD is applied to the cathode of the photodiode PD. On the other hand, a direct-current voltage VPS is applied to the source of the MOS transistor T1, and also to one end of a capacitor C2 of which the other end is connected to the source of the MOS transistor T2. A signal φD is fed to the drain of the MOS transistor T2, and a signal φV is fed to the gate of the MOS transistor T3. Moreover, the node between the gates of the MOS transistors T1 and T2 is connected to one end of a capacitor C1, and a signal φVRB is fed to the other end of this capacitor C1. The signal φVRB is a binary signal that takes one of two predetermined levels, i.e. either a low level or a high level, at a time. Here, a low level refers to a level equal to, for example, the ground level, and a high level refers to a voltage that is higher than that.

(1) How to Convert the Light Incident on the Individual Pixels into an Electric Signal In this pixel having the circuit configuration shown in FIG. 3, to permit the MOS transistor T1 to operate in a subthreshold region, the signal φVRB fed to the capacitor C1 is turned to a low level. When the signal φVRB is turned to a low level in this way, the capacitor C1 acts in a manner quite similar to the capacitors formed by insulating oxide films at the gate and back gate of the MOS transistors T1 and T2.

In this state, when light enters the photodiode PD, a photoelectric current is generated therein, and, due to the subthreshold characteristics of MOS transistors, a voltage having the value obtained by converting the photoelectric current natural-logarithmically appears at the gates of the MOS transistors T1 and T2. This voltage causes a current to flow through the MOS transistor T2, and, as a result, an electric charge that is equivalent to the value obtained by converting the integral of the photoelectric current natural-logarithmically is accumulated in the capacitor C2. That is, a voltage proportional to the value obtained by converting the integral of the photoelectric current natural-logarithmically appears at the node "a" between the capacitor C2 and the source of the MOS transistor T2. Here, the MOS transistor T3 is off.

Next, the pulse signal φV is fed to the gate of the MOS transistor T3 to turn this MOS transistor T3 on. This causes the electric charge accumulated in the capacitor C2 to be fed as the output current to the output signal line 6. The current thus fed to the output signal line 6 has the value obtained by converting the integral of the photoelectric current natural-logarithmically. In this way, it is possible to read a signal (output current) that is proportional to the logarithm of the amount of incident light. After this signal has been read, the MOS transistor T3 is turned off.

(2) How to Reset the Individual Pixels

Figure 4:
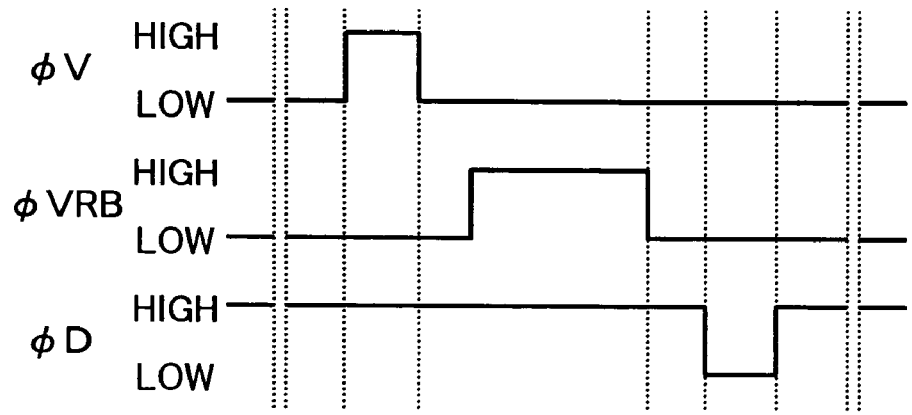
FIG. 4 is a timing chart of the signals fed to each pixel in the first embodiment.
Figure 5A:
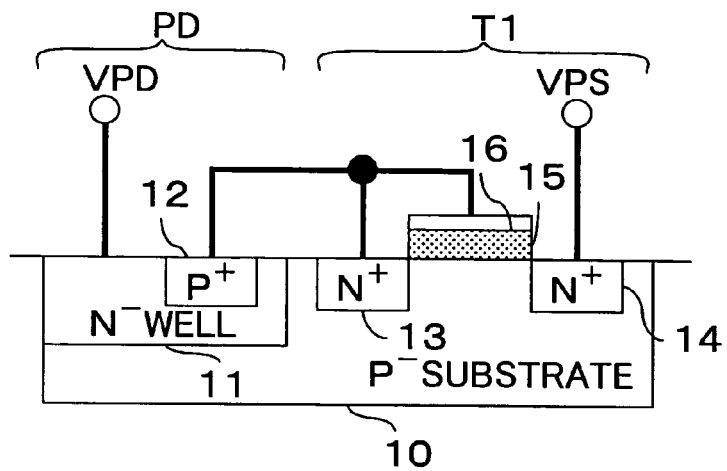
FIGS. 5A to 5E are diagrams showing the structure of and the potential relationship observed in a pixel according to the invention.

Now, how resetting is achieved in the pixel having the circuit configuration shown in FIG. 3 will be described with reference to the drawings. FIG. 4 is a timing chart of the signals fed to the signal lines connected to the individual circuit elements constituting each pixel during resetting. FIG. 5A is a sectional view showing the structure of the photodiode PD and the MOS transistor T1. FIGS. 5B to 5E are diagrams showing the relationship among the potentials at various parts of the sectional view shown in FIG. 5A. In FIGS. 5B to 5E, the arrow at the left indicates the direction in which the potential increases.

Incidentally, as shown in FIG. 5A, the photodiode PD is formed, for example, by forming an N-type well layer 11 in a P-type semiconductor substrate (hereinafter referred to as the "P-type substrate") 10 and then forming, in this N-type well layer 11, a P-type diffusion layer 12. On the other hand, the MOS transistor T1 is formed by forming N-type diffusion layers 13 and 14 in the P-type substrate 10 and then forming, on top of the channel left between those N-type diffusion layers 13 and 14, an oxide film 15 and, further on top thereof, a polysilicon layer 16. Here, the N-type well layer 11 functions as the cathode of the photodiode PD, and the P-type diffusion layer 12 functions as the anode thereof. On the other hand, the N-type diffusion layers 13 and 14 function as the drain and the source, respectively, of the MOS transistor T1, and the oxide film 15 and the polysilicon layer 16 function as the gate insulating film and the gate electrode, respectively, thereof. Here, in the P-type substrate 10, the region between the N-type diffusion layers 13 and 14 is called the sub-gate region.

As described under (1) above, in the pixel having the circuit configuration shown in FIG. 3, when the pulse signal φV is fed to the gate of the MOS transistor T3, an electric signal (output signal) obtained by converting the amount of incident light logarithmically is output to the output signal line 6. After this output signal has been output, the pulse signal φV turns to a low level, and resetting starts. Now, how this resetting is achieved will be described with reference to FIGS. 4 and 5A to 5E.

Figure 5B:
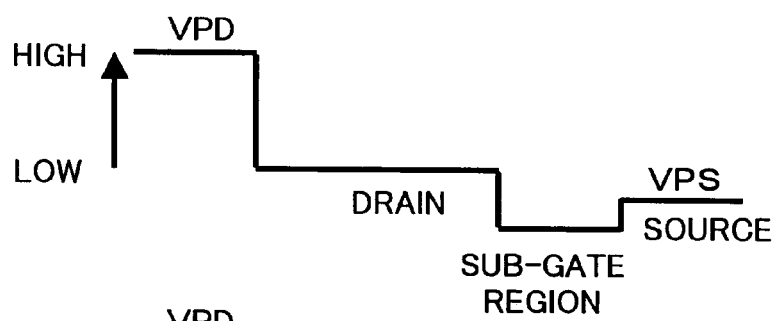

As described above, after the output signal has been output as a result of the pulse signal φV being fed to the gate of the MOS transistor T3, resetting starts. When resetting starts, a negative electric charge flows into the MOS transistor T1 via the source thereof, so that the positive electric charge accumulated at the gate and drain of the MOS transistor T1, at the gate of the MOS transistor T2, at the anode of the photodiode PD, and in the capacitor C1 recombine therewith. As a result, as shown in FIG. 5B, the potentials at the drain and sub-gate region of the MOS transistor T1 drop down to certain levels.

Figure 5C:
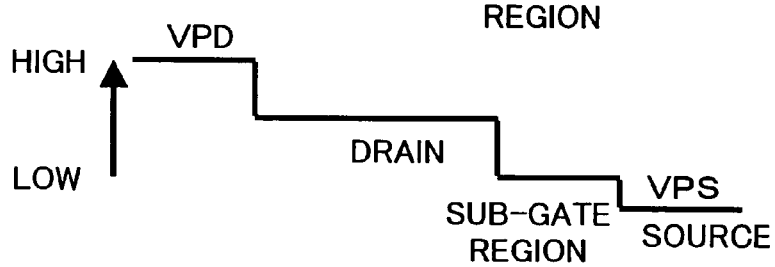

In this way, the potentials at the drain and sub-gate region of the MOS transistor T1 start being reset to their original levels, but the speed of resetting becomes slow when those potentials reach certain levels. This is particularly noticeable when a thus far brightly-lit subject has suddenly become dimly-lit. To avoid this, next, the voltage φVRB fed to the capacitor C1 is made higher so as to make the gate voltage of the MOS transistor T1 higher. By making the gate voltage of the MOS transistor T1 higher in this way, the potentials in the MOS transistor T1 change so as to have a relationship as shown in FIG. 5C; that is, the potentials at the sub-gate region and drain of the MOS transistor T1 become higher. This increases the amount of negative electric charge that flows into the MOS transistor T1 via the source thereof, and thereby permits quick recombination of the positive electric charges accumulated at the gate and drain of the MOS transistor T1, at the gate of the MOS transistor T2, at the anode of the photodiode PD, and in the capacitor C1.

Figure 5D:
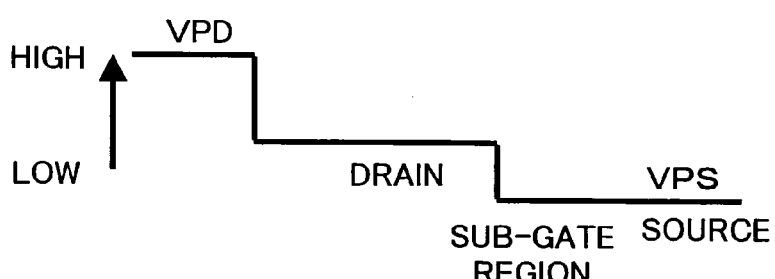
Figure 5E:
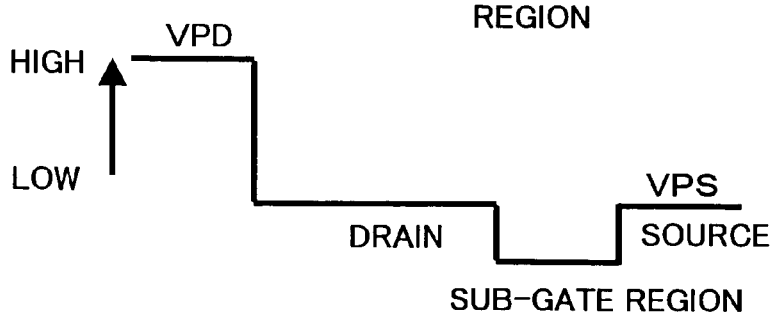

As a result, as shown in FIG. 5D, the potentials at the drain and sub-gate region of the MOS transistor T1 become lower than in the state shown in FIG. 5C. When the potentials in the MOS transistor T1 have changed so as to have a relationship as shown in FIG. 5D, the voltage φVRB fed to the capacitor C1 is turned to a low level, and the gate voltage of the MOS transistor T1 is lowered. This causes the potentials at the drain and sub-gate region of the MOS transistor T1 to have a relationship as shown in FIG. 5E, and thus causes those potentials to be reset to their original levels. After the potentials in the MOS transistor T1 have been reset to their original levels in this way, the voltage of the signal φD is turned to a low level so that the capacitor C2 is discharged and thereby the potential at the node "a" is reset to its original level. Thereafter, the voltage of the signal φD is turned back to a high level in preparation for image sensing.

In this way, resetting is achieved by switching the voltage at the gate of the MOS transistor T1 of which the drain is connected to the photodiode serving as a photosensitive element. This helps improve the response of the individual pixels of the solid-state image-sensing device, and thereby makes it possible to perform satisfactory image shooting free from after-images even when a dimly-lit subject is shot or when a thus far brightly-lit subject has suddenly become dimly-lit.

Second Embodiment

Next, a second embodiment of the invention will be described with reference to the drawings. FIG. 6 is a circuit diagram showing the configuration of each pixel of the solid-state image-sensing device of this embodiment. It is to be noted that such elements, signal lines, and others as are used for the same purposes here as in the pixel shown in FIG. 3 are identified with the same reference symbols, and their detailed descriptions will be omitted.

As shown in FIG. 6, in this embodiment, a signal φVPS is fed to the source of the MOS transistor T1, and the capacitor C1 is omitted. In other respects, each pixel of this embodiment is configured in the same manner as in the first embodiment (FIG. 3). The signal φVPS is a binary signal that takes one of two predetermined levels, i.e. either a low level or a high level, at a time. Here, a high level refers to a voltage that is approximately equal to the direct-current voltage VPS and that causes the MOS transistor T1 to operate in a subthreshold region, and a low level refers to a voltage that is lower than that and that brings the MOS transistor T1 into a conducting state.

(1) How to Convert the Light Incident on the Individual Pixels into an Electric Signal In this pixel having the circuit configuration shown in FIG. 6, to permit the MOS transistor T1 to operate in a subthreshold region, the signal φVPS fed to the source of the MOS transistor T1 is turned to a high level. In this state, when light enters the photodiode PD, a photoelectric current is generated therein, and, due to the subthreshold characteristics of MOS transistors, a voltage having the value obtained by converting the photoelectric current natural-logarithmically appears at the gates of the MOS transistors T1 and T2. This voltage causes a current to flow through the MOS transistor T2, and, as a result, an electric charge that is equivalent to the value obtained by converting the integral of the photoelectric current natural-logarithmically is accumulated in the capacitor C2. That is, a voltage proportional to the value obtained by converting the integral of the photoelectric current natural-logarithmically appears at the node "a" between the capacitor C2 and the source of the MOS transistor T2. Here, the MOS transistor T3 is off.

Next, the pulse signal φV is fed to the gate of the MOS transistor T3 to turn this MOS transistor T3 on. This causes the electric charge accumulated in the capacitor C2 to be fed as the output current to the output signal line 6. The current thus fed to the output signal line 6 has the value obtained by converting the integral of the photoelectric current natural-logarithmically. In this way, it is possible to read a signal (output current) that is proportional to the logarithm of the amount of incident light. After this signal has been read, the MOS transistor T3 is turned off.

(2) How to Reset the Individual Pixels

Figure 7:
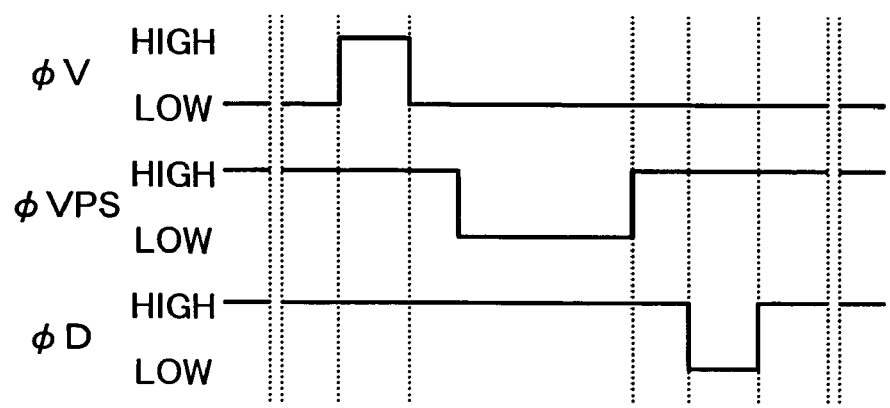
FIG. 7 is a timing chart of the signals fed to each pixel in the second embodiment.
Figure 8A:
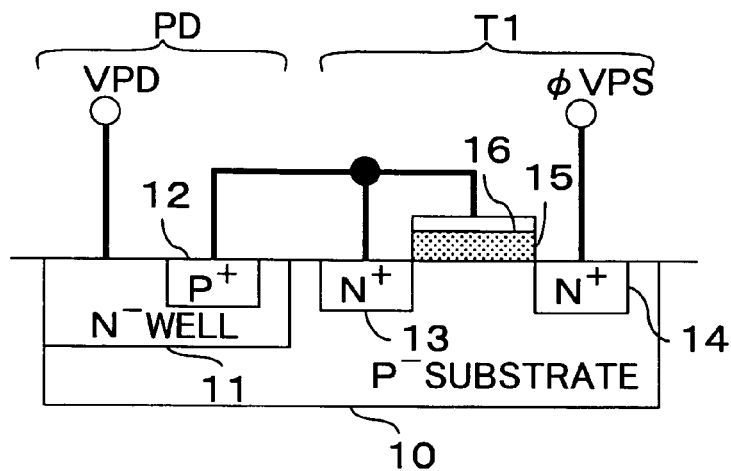
FIGS. 8A to 8E are diagrams showing the structure of and the potential relationship observed in a pixel according to the invention.

Now, how resetting is achieved in the pixel having the circuit configuration shown in FIG. 6 will be described with reference to the drawings. FIG. 7 is a timing chart of the signals fed to the signal lines connected to the individual circuit elements constituting each pixel during resetting. FIG. 8A is a sectional view, like FIG. 5A, showing the structure of the photodiode PD and the MOS transistor T1. FIGS. 8B to 8E are diagrams showing the relationship among the potentials at various parts of the sectional view shown in FIG. 8A. In FIGS. 8B to 8E, the arrow at the left indicates the direction in which the potential increases. It is to be noted that no detailed description will be given of FIG. 8A, which is similar to FIG. 5A described in connection with the first embodiment.

As described under (1) above, in the pixel having the circuit configuration shown in FIG. 6, when the pulse signal φV is fed to the gate of the MOS transistor T3, an electric signal (output signal) obtained by converting the amount of incident light logarithmically is output to the output signal line 6. After this output signal has been output, the pulse signal φV turns to a low level, and resetting starts. Now, how this resetting is achieved will be described with reference to FIGS. 7 and 8A to 8E.

Figure 8B:
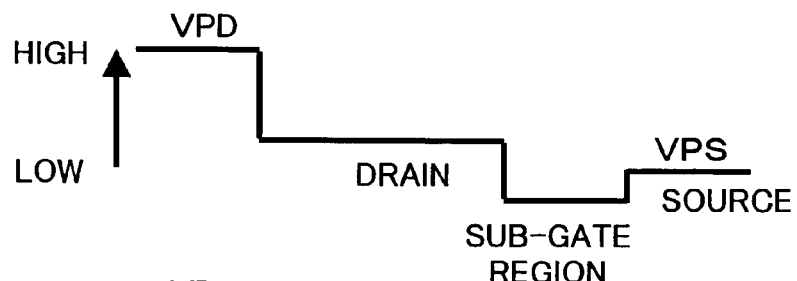

As described above, after the output signal has been output as a result of the pulse signal φV being fed to the gate of the MOS transistor T3, resetting starts. When resetting starts, a negative electric charge flows into the MOS transistor T1 via the source thereof, so that the positive electric charges accumulated at the gate and drain of the MOS transistor T1, at the gate of the MOS transistor T2, and at the anode of the photodiode PD recombine therewith. As a result, as shown in FIG. 8B, the potentials at the drain and sub-gate region of the MOS transistor T1 are reset to a certain degree and thus drop down to certain levels.

Figure 8C:
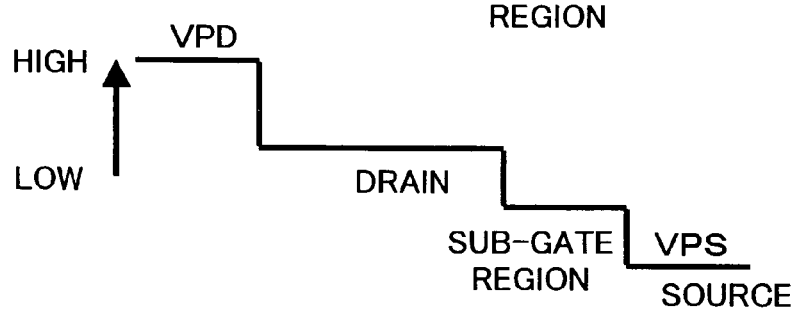

In this way, the potentials at the drain and sub-gate region of the MOS transistor T1 start being reset to their original levels, but the speed of resetting becomes slow when those potentials reach certain levels. This is particularly noticeable when a thus far brightly-lit subject has suddenly become dimly-lit. To avoid this, next, the signal φVPS fed to the source of the MOS transistor T1 is turned to a low level. By lowering the source voltage of the MOS transistor T1 in this way, the potentials in the MOS transistor T1 change so as to have a relationship as shown in FIG. 8C. This increases the amount of negative electric charge that flows into the MOS transistor T1 via the source thereof, and thereby permits quick recombination of the positive electric charges accumulated at the gate and drain of the MOS transistor T1, at the gate of the MOS transistor T2, and at the anode of the photodiode PD.

Figure 8D:
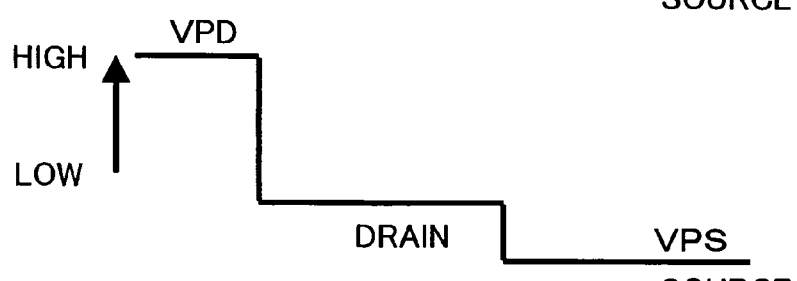
Figure 8E:
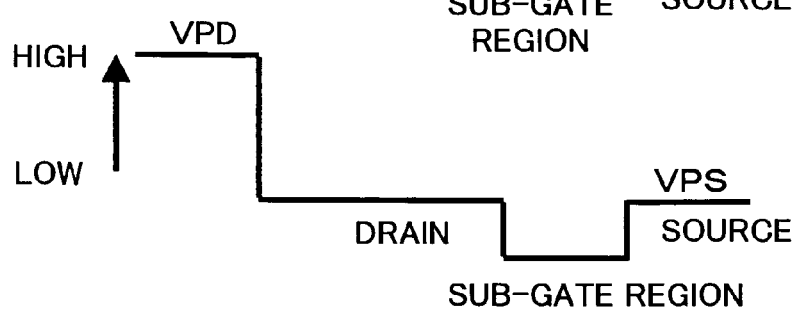

As a result, as shown in FIG. 8D, the potentials at the drain and sub-gate region of the MOS transistor T1 become lower than in the state shown in FIG. 8C. When the potentials in the MOS transistor T1 have changed so as to have a relationship as shown in FIG. 8D, the signal φVPS fed to the source of the MOS transistor T1 is turned to a high level. This causes the potentials in the MOS transistor T1 to have a relationship as shown in FIG. 8E, and thus causes those potentials to be reset to their original levels. After the potentials in the MOS transistor T1 have been reset to their original levels in this way, the voltage of the signal φD is turned to a low level so that the capacitor C2 is discharged and thereby the potential at the node "a" is reset to its original level. Thereafter, the voltage of the signal φD is turned back to a high level in preparation for image sensing.

In this way, resetting is achieved by manipulating the voltage fed to the source of the MOS transistor T1 of which the drain is electrically connected to the photodiode serving as a photosensitive element. This helps improve the response of the individual pixels of the solid-state image-sensing device, and thereby makes it possible to perform satisfactory image shooting free from after-images even when a dimly-lit subject is shot or when a thus far brightly-lit subject has suddenly become dimly-lit.

The reading of the signal from each pixel may be achieved by means of a CCD (charge-coupled device). In that case, the transfer of an electric charge to the CCD is achieved by providing a potential barrier with a variable potential that corresponds to the MOS transistor T3 shown in FIG. 3 or 6.

Second Example of the Pixel Configuration

Figure 9:
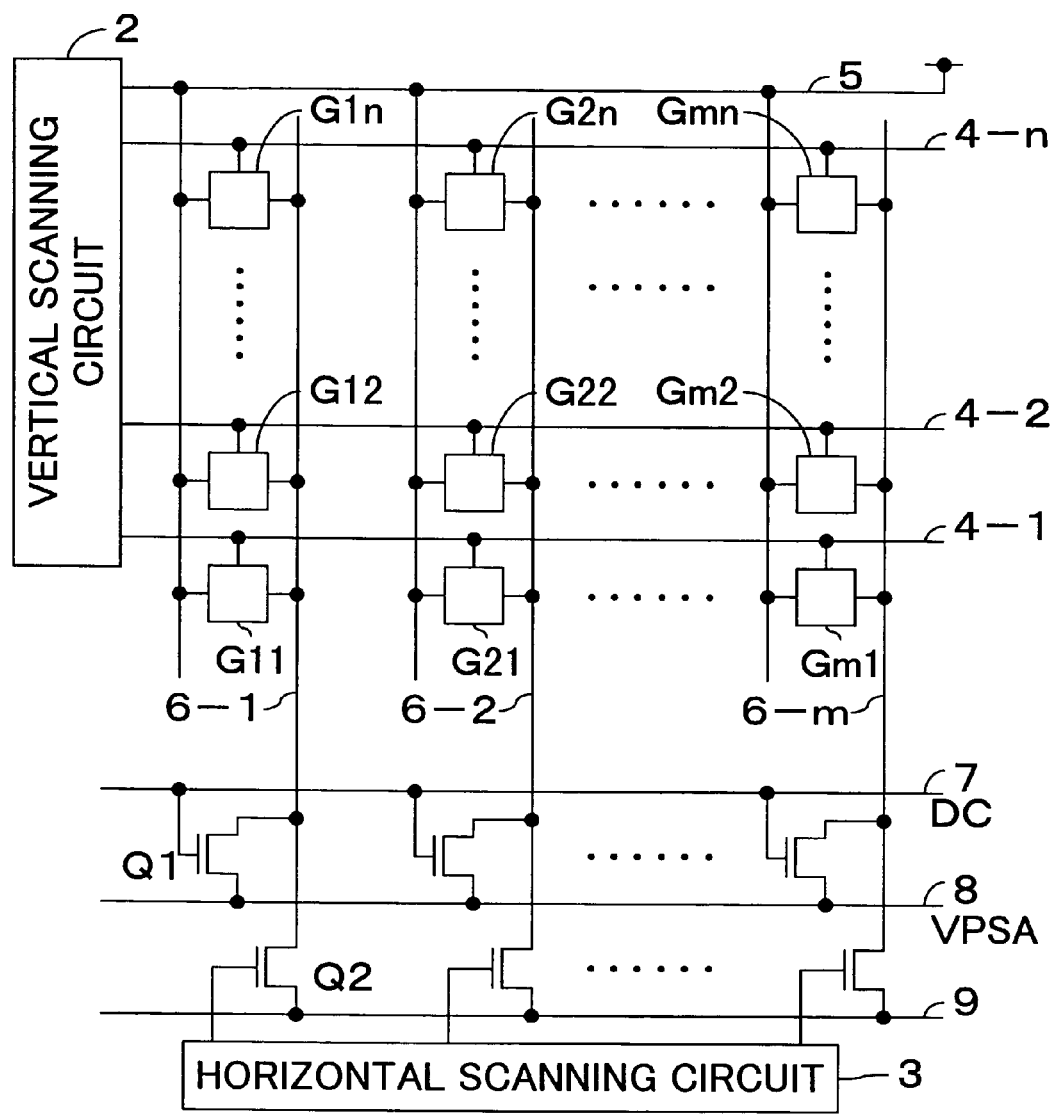
FIG. 9 is a block circuit diagram illustrating the overall configuration of another two-dimensional solid-state image-sensing device embodying the invention.

FIG. 9 schematically shows the configuration of part of another two-dimensional MOS-type solid-state image-sensing device embodying the invention. In this figure, reference symbols G11 to Gmn represent pixels that are arranged in a two-dimensional array (in a matrix). Reference numeral 2 represents a vertical scanning circuit, which scans lines (rows) 4-1, 4-2, . . . , 4-n sequentially. Reference numeral 3 represents a horizontal scanning circuit, which reads out, sequentially pixel by pixel in a horizontal direction, the signals fed from the individual pixels to output signal lines 6-1, 6-2, . . . , 6-m as a result of photoelectric conversion performed in those pixels. Reference numeral 5 represents a power line. The individual pixels are connected not only to the lines 4-1, 4-2, . . . , 4-n, to the output signal lines 6-1, 6-2, . . . , 6-m, and to the power line 5 mentioned above, but also to other lines (for example clock lines and bias supply lines). These other lines, however, are omitted in FIG. 9, and are shown in individual embodiments of the invention shown in FIG. 11 and the following figures.

As shown in FIG. 9, for each of the output signal lines 6-1, 6-2, . . . , 6-m, a pair of N-channel MOS transistors Q1 and Q2 is provided. Here, a description will be given only with respect to the output signal line 6-1 as their representative. The MOS transistor Q1 has its gate connected to a direct-current voltage line 7, has its drain connected to the output signal line 6-1, and has its source connected to a direct-current voltage VPSA line 8. On the other hand, the MOS transistor Q2 has its drain connected to the output signal line 6-1, has its source connected to a signal line 9 serving as a final destination line, and has its gate connected to the horizontal scanning circuit 3.

Figure 10A:
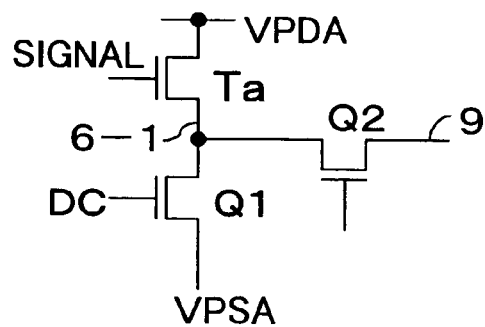
FIGS. 10A and 10B are circuit diagrams of a portion of the circuit shown in FIG. 9.

As will be described later, the pixels G11 to Gmn are each provided with an N-channel MOS transistor Ta that outputs a signal in accordance with the photoelectric charge generated in each pixel. How this MOS transistor Ta is connected to the above-mentioned MOS transistor Q1 is shown in FIG. 10A. This MOS transistor Ta corresponds to a fourth MOS transistor T4 in the third, fourth, sixth, eighth, and ninth embodiments, and corresponds to a second MOS transistor T2 in the fifth, seventh, and tenth embodiments. Here, the direct-current voltage VPSA connected to the source of the MOS transistor Q1 and the direct-current voltage VPDA connected to the drain of the MOS transistor Ta fulfill the relation VPDA>VPSA, where the direct-current voltage VPSA is equal to, for example, the ground-level voltage. In this circuit configuration, the signal from a pixel is fed to the gate of the upper-stage MOS transistor Ta, and a direct-current voltage DC is kept applied to the gate of the lower-stage MOS transistor Q1. Thus, the lower-stage MOS transistor Q1 is equivalent to a resistor or constant-current source, and therefore the circuit shown in FIG. 10A forms an amplifier circuit of a source-follower type. Here, it can safely be assumed that, as a result of amplification, the MOS transistor Ta outputs a current.

Figure 10B:
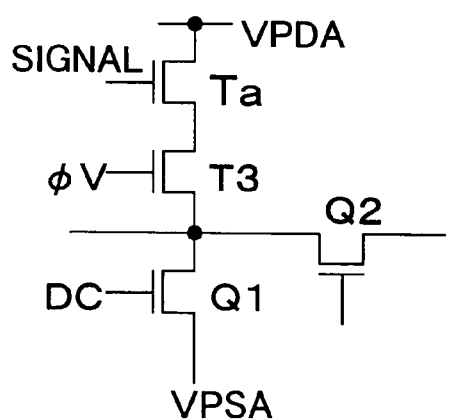

The MOS transistor Q2 is controlled by the horizontal scanning circuit 3 so as to function as a switching device. As will be described later, in all of the embodiments of the invention shown in FIG. 11 and the following figures, within each pixel, another, i.e. a third, N-channel MOS transistor T3 functioning as a switch is provided. If this third MOS transistor T3 is illustrated explicitly, the circuit shown in FIG. 10A has, more precisely, a circuit configuration as shown in FIG. 10B. Specifically, the MOS transistor T3 is inserted between the MOS transistor Q1 and the MOS transistor Ta. Here, the MOS transistor T3 serves to select a row, and the MOS transistor Q2 serves to select a column. It is to be noted that the circuit configurations shown in FIGS. 9, 10A, and 10B are common to the third to tenth embodiments of the invention described hereafter.

The circuit configuration shown in FIGS. 10A and 10B permits the signal to be output with a high gain. Accordingly, even in a case where the photoelectric current generated in a photosensitive element is converted natural-logarithmically to obtain a wider dynamic range and thus the output signal obtained is comparatively low, this amplifier circuit amplifies the signal so as to make it sufficiently high and thus easier to process in the succeeding signal processing circuit (not shown). Here, the MOS transistor Q1 that serves as the load resistor of the amplifier circuit is provided within each pixel; however, such transistors may be provided, instead, one for each of the output signal lines 6-1, 6-2, ..., 6-m, i.e. one for each of the groups of pixels that individually constitute columns, with the pixels constituting each column collectively connected to one of the output signal lines 6-1, 6-2, ..., 6-m. This helps reduce the number of load resistors or constant-current sources required, and thus reduce the area occupied by the amplifying circuits on a semiconductor chip.

Third Embodiment

Figure 11:
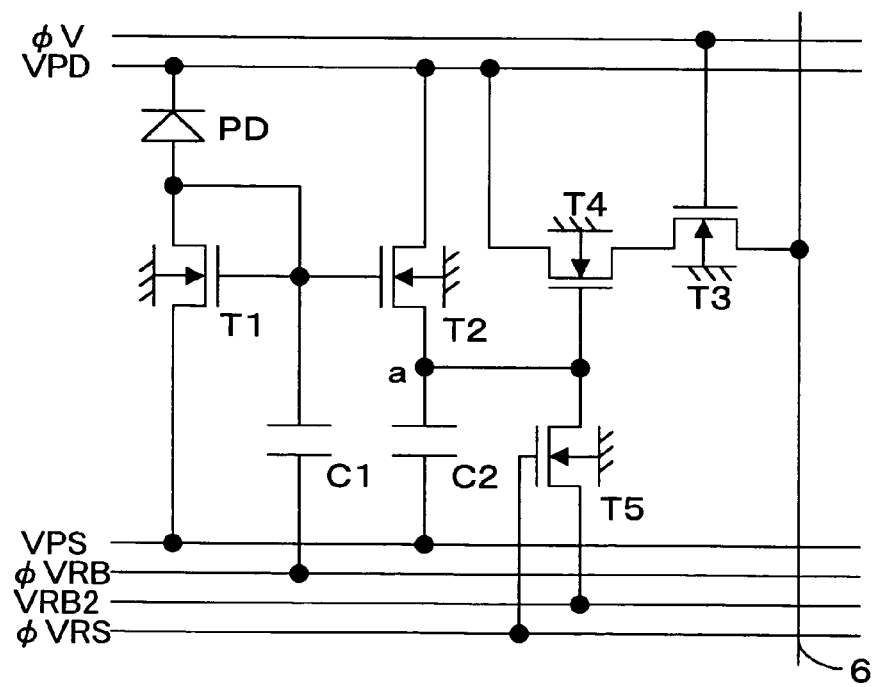
FIG. 11 is a circuit diagram showing the configuration of each pixel in a third embodiment of the invention.

Next, a third embodiment of the invention, which is applicable to each pixel of the second example of the pixel configuration shown in FIG. 9, will be described with reference to the drawings. FIG. 11 is a circuit diagram showing the configuration of each pixel of the solid-state image-sensing device of this embodiment. It is to be noted that such elements, signal lines, and others as are used for the same purposes here as in the pixel shown in FIG. 3 are identified with the same reference symbols, and their detailed descriptions will be omitted.

As shown in FIG. 11, in this embodiment, as compared with the pixel shown in FIG. 3, there are provided additionally a fourth MOS transistor T4 having its gate connected to the node "a" for performing current amplification in accordance with the voltage at the node "a", and a fifth MOS transistor T5 for initializing the potential at the node "a". The source of the MOS transistor T3 is connected to the output signal line 6 (this output signal line 6 corresponds to the output signal lines 6-1, 6-2, ... 6-m shown in FIG. 9). Just like the MOS transistors T1 to T3, the MOS transistors T4 and T5 are both N-channel MOS transistors, and have their back gates grounded.

A direct-current voltage VPD is applied to the drain of the MOS transistor T4, and a signal φV is fed to the gate of the MOS transistor T3. A direct-current voltage VRB2 is applied to the source of the MOS transistor T5, and a signal φVRS is fed to the gate of the same MOS transistor T5. The direct-current voltage VPD is applied also to the drain of the MOS transistor T2. In this embodiment, the MOS transistors T1 to T3 and the capacitors C1 and C2 operate in the same manner as in the first embodiment (FIG. 3) so as to output an electric signal (output signal) obtained by converting the amount of incident light logarithmically.

(1) How to Convert the Light Incident on the Individual Pixels into an Electric Signal In this embodiment, as in the first embodiment, by turning the voltage of the signal φVRB to a low level so that the MOS transistor T1 operates in a subthreshold region, it is possible to output to the output signal line 6 an output signal obtained by logarithmically converting the photoelectric current output from the photodiode PD in accordance with the amount of incident light. Now, a description will be given of how the individual circuit elements of the pixel shown in FIG. 11 operate when the output signal is produced by converting the photoelectric current logarithmically.

When light enters the photodiode PD, a photoelectric current is generated therein, and, due to the subthreshold characteristics of MOS transistors, a voltage having the value obtained by converting the photoelectric current natural-logarithmically appears at the gates of the MOS transistors T1 and T2. This voltage causes a current to flow through the MOS transistor T2, and, as a result, an electric charge that is equivalent to the value obtained by converting the integral of the photoelectric current natural-logarithmically is accumulated in the capacitor C2. That is, a voltage proportional to the value obtained by converting the integral of the photoelectric current natural-logarithmically appears at the node "a" between the capacitor C2 and the source of the MOS transistor T2. Here, the MOS transistors T3 and T5 are off.

Next, the pulse signal φV is fed to the gate of the MOS transistor T3 to turn this MOS transistor T3 on. This causes a current proportional to the voltage applied to the gate of the MOS transistor T4 to be fed through the MOS transistors T3 and T4 to the output signal line 6. Here, the voltage applied to the gate of the MOS transistor T4 is equal to the voltage appearing at the node "a", and therefore the current thus fed to the output signal line 6 has the value obtained by converting the integral of the photoelectric current natural-logarithmically. In this way, a signal (output current) proportional to the logarithm of the amount of incident light is read, and thereafter the MOS transistor T3 is turned off.

(2) How to Reset the Individual Pixels

Figure 12:
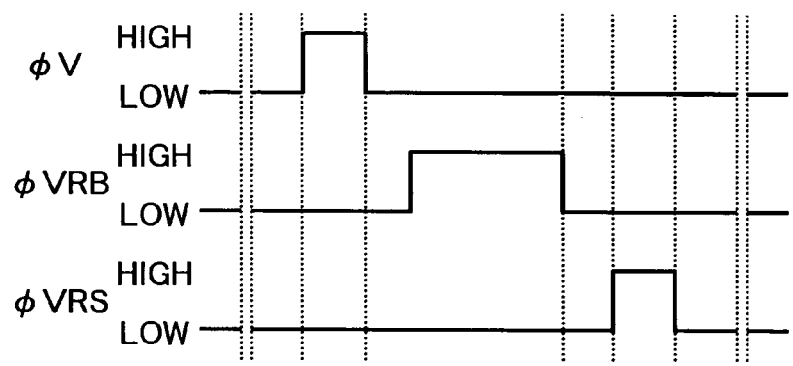
FIG. 12 is a timing chart of the signals fed to each pixel in the third embodiment.

Now, how resetting is achieved in the pixel having the circuit configuration shown in FIG. 11 will be described with reference to the drawings. FIG. 12 is a timing chart of the signals fed to the signal lines connected to the individual circuit elements constituting each pixel during resetting. As described under (1) above, in the pixel having the circuit configuration shown in FIG. 11, when the pulse signal φV is fed to the gate of the MOS transistor T3, an electric signal (output signal) obtained by converting the amount of incident light logarithmically is output to the output signal line 6. After this output signal has been output, the pulse signal φV turns to a low level, and resetting starts. In this embodiment, the relationship of the potentials in the MOS transistor T1 during resetting is the same as in the first embodiment, i.e. as shown in FIGS. 5B to 5E. Now, how this resetting is achieved will be described with reference to FIGS. 5A to 5E and 12.

As described above, after the output signal has been output as a result of the pulse signal φV being fed to the gate of the MOS transistor T3, resetting starts. When resetting starts, as in the first embodiment, a negative electric charge flows into the MOS transistor T1 via the source thereof, causing the potentials in the MOS transistor T1 to have a relationship as shown in FIG. 5B.

Next, the voltage φVRB fed to the capacitor C1 is made higher so as to make the gate voltage of the MOS transistor T1 higher. This causes the potentials at the sub-gate region and drain of the MOS transistor T1 to become higher as shown in FIG. 5C. This increases the amount of negative electric charge that flows into the MOS transistor T1 via the source thereof, and thereby permits quick recombination of the positive electric charges accumulated at the gate and drain of the MOS transistor T1, at the gate of the MOS transistor T2, at the anode of the photodiode PD, and in the capacitor C1.

As a result, as shown in FIG. 5D, the potentials at the drain and sub-gate region of the MOS transistor T1 become lower. When the potentials in the MOS transistor T1 have changed so as to have a relationship as shown in FIG. 5D, the voltage φVRB fed to the capacitor C1 is turned to a low level, and the gate voltage of the MOS transistor T1 is lowered. This causes the potentials at the drain and sub-gate region of the MOS transistor T1 to have a relationship as shown in FIG. 5E, and thus causes those potentials to be reset to their original levels. After the potentials in the MOS transistor T1 have been reset to their original levels in this way, the pulse signal φVRS is fed to the gate of the MOS transistor T5 so that the capacitor C2 is discharged through the MOS transistor T5 and thereby the potential at the node "a" is reset to its original level.

Fourth Embodiment

Figure 13:
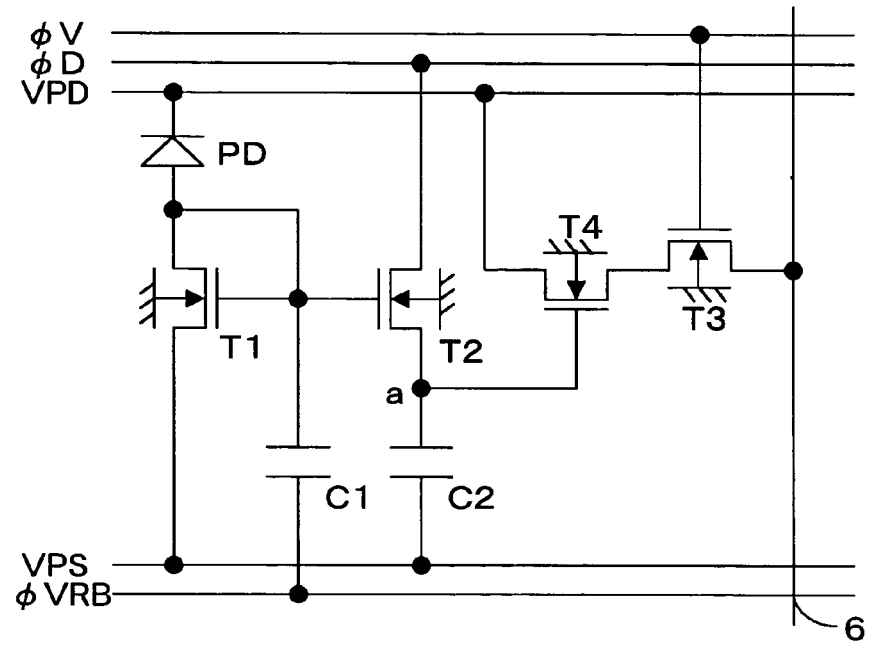
FIG. 13 is a circuit diagram showing the configuration of each pixel in a fourth embodiment of the invention.

Next, a fourth embodiment of the invention will be described with reference to the drawings. FIG. 13 is a circuit diagram showing the configuration of each pixel of the solid-state image-sensing device of this embodiment. It is to be noted that such elements, signal lines, and others as are used for the same purposes here as in the pixel shown in FIG. 11 are identified with the same reference symbols, and their detailed descriptions will be omitted.

As shown in FIG. 13, in this embodiment, the initialization of the potential at the capacitor C2, and thus at the node "a", is achieved by feeding the signal φD to the drain of the MOS transistor T2, and thus the MOS transistor T5 is omitted. In other respects, each pixel of this embodiment is configured in the same manner as in the third embodiment (FIG. 11). Here, while the signal φD is kept at a high level, the capacitor C2 performs integration; while the signal φD is kept at a low level, the electric charge accumulated in the capacitor C2 is discharged through the MOS transistor T2 to make the voltage at the capacitor C2, and thus at the gate of the MOS transistor T4, approximately equal to the low-level voltage of the signal φD (that is, the voltage is reset). In this embodiment, the omission of the MOS transistor T5 helps simplify the circuit configuration.

In this embodiment, image sensing is achieved in the following manner. As in the third embodiment, the signal φVRB fed to the capacitor C1 is turned to a low level so that the MOS transistor T1 operates in a subthreshold region. Moreover, the signal φD is turned to a high level so that an electric charge equivalent to the value obtained by converting the integral of the photoelectric current natural-logarithmically is accumulated in the capacitor C2. Then, with predetermined timing, the MOS transistor T3 is turned on so that a current proportional to the voltage applied to the gate of the MOS transistor T4 is fed through MOS transistors T3 and T4 to the output signal line 6.

On the other hand, resetting of the pixel is achieved by controlling the signals with the timing shown in FIG. 4 as in the first embodiment. Specifically, as in the first embodiment, resetting starts after the feeding of the pulse signal φV. Then, the voltage φVRB fed to the capacitor C1 is made higher so as to make the gate voltage of the MOS transistor T1 higher. This increases the amount of negative electric charge that flows into the MOS transistor T1 via the source thereof, and thereby permits, as in the first embodiment, quick recombination of the positive electric charges accumulated at the gate and drain of the MOS transistor T1, at the gate of the MOS transistor T2, at the anode of the photodiode PD, and in the capacitor C1.

Then, the voltage φVRB applied to the capacitor C1 is turned back to its original level so as to make the gate voltage of the MOS transistor T1 lower and thereby reset the potentials at the drain and sub-gate region of the MOS transistor T1 to their original levels. After the potentials at the drain and sub-gate region of the MOS transistor T1 have been reset to their original levels in this way, the voltage of the signal φD is turned to a low level so as to discharge the capacitor C2 and thereby reset the potential at the node "a" to its original level. Thereafter, the voltage of the signal φD is turned back to a high level in preparation for image sensing.

Fifth Embodiment

Figure 14:
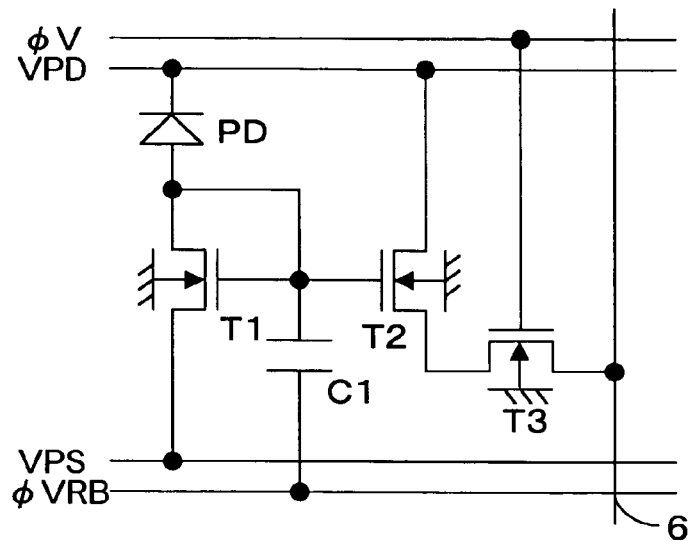
FIG. 14 is a circuit diagram showing the configuration of each pixel in a fifth embodiment of the invention.

Next, a fifth embodiment of the invention will be described with reference to the drawings. FIG. 14 is a circuit diagram showing the configuration of each pixel of the solid-state image-sensing device of this embodiment. It is to be noted that such elements, signal lines, and others as are used for the same purposes here as in the pixel shown in FIG. 13 are identified with the same reference symbols, and their detailed descriptions will be omitted.

As shown in FIG. 14, in this embodiment, the direct-current voltage VPD is applied to the drain of the MOS transistor T2, and the capacitor C2 and the MOS transistor T4 are omitted. That is, the MOS transistor T2 has its source connected to the drain of the MOS transistor T3. In other respects, each pixel of this embodiment is configured in the same manner as in the fourth embodiment (FIG. 13).

In this pixel configured as described above, image sensing is achieved in the following manner. As in the fourth embodiment, the signal φVRB fed to the capacitor C1 is turned to a low level so that the MOS transistor T1 operates in a subthreshold region. By making the MOS transistor T1 operate in this way, a current having the value natural-logarithmically proportional to the photoelectric current flows through the MOS transistor T2 as its drain current.

Then, the pulse signal φV is fed to the gate of the MOS transistor T3 to turn on this MOS transistor T3. This causes a current having the value natural-logarithmically proportional to the photoelectric current to be fed through the MOS transistor T3, as its drain current, to the output signal line 6. At this time, the drain voltage of the MOS transistor Q1 (FIG. 9), which is determined by the on-state resistances of the MOS transistors T2 and Q1 and the current flowing therethrough, appears as the output signal on the output signal line 6. After this output signal has been read, the MOS transistor T3 is turned off.

On the other hand, resetting of the pixel is achieved in the following manner. As in the fourth embodiment, resetting starts after the feeding of the pulse signal φV. Then, the voltage φVRB fed to the capacitor C1 is made higher so as to make the gate voltage of the MOS transistor T1 higher. This increases the amount of negative electric charge that flows into the MOS transistor T1 via the source thereof, and thereby permits, as in the first embodiment, quick recombination of the positive electric charges accumulated at the gate and drain of the MOS transistor T1, at the gate of the MOS transistor T2, at the anode of the photodiode PD, and in the capacitor C1.

Then, the voltage φVRB applied to the capacitor C1 is turned to a low level so as to make the gate voltage of the MOS transistor T1 lower and thereby reset the potentials at the drain and sub-gate region of the MOS transistor T1 to their original levels. In this way, the potentials in the MOS transistor T1 are reset to their original levels to make the pixel ready for image sensing again.

In this embodiment, it is not necessary to perform integration of the photoelectric signal by the use of a capacitor C2 as performed in the fourth embodiment described above, and thus no time is required for such integration, nor is it necessary to reset the capacitor C2. This ensures accordingly faster signal processing. Moreover, as compared with the fourth embodiment, the capacitor C2 and the MOS transistor T4 can be omitted, and this helps further simplify the circuit configuration and reduce the pixel size.

Sixth Embodiment

Figure 15:
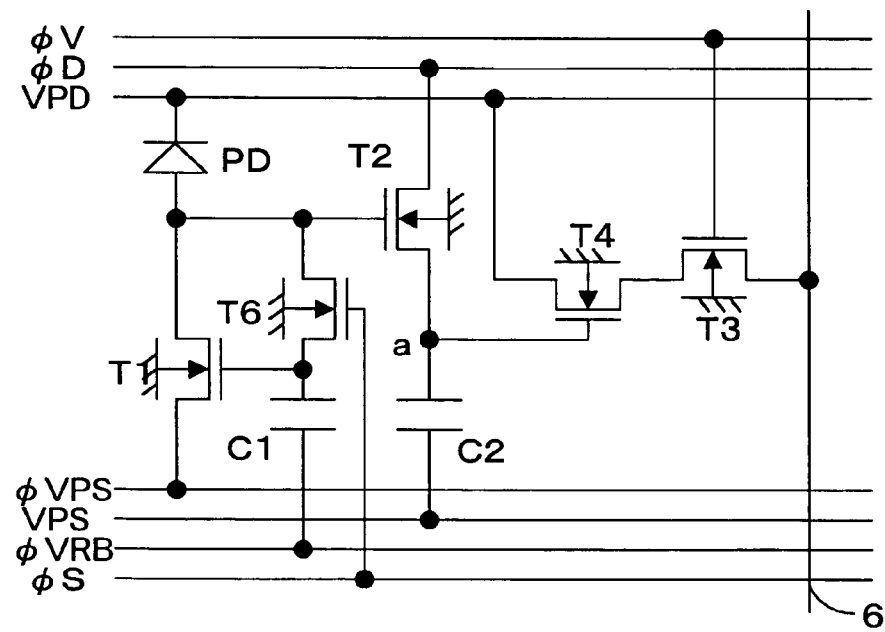
FIG. 15 is a circuit diagram showing the configuration of each pixel in a sixth embodiment of the invention.

Next, a sixth embodiment of the invention will be described with reference to the drawings. FIG. 15 is a circuit diagram showing the configuration of each pixel of the solid-state image-sensing device of this embodiment. It is to be noted that such elements, signal lines, and others as are used for the same purposes here as in the pixel shown in FIG. 13 are identified with the same reference symbols, and their detailed descriptions will be omitted.

As shown in FIG. 15, in this embodiment, the drain and gate of the MOS transistor T1 are not connected together directly as in the fourth embodiment (FIG. 13), but are connected to each other through a sixth MOS transistor T6. This MOS transistor T6 has its drain connected to the drain of the MOS transistor T1, and has its source connected to the node between the gate of the MOS transistor T1 and the capacitor C1. Moreover, a signal ϕS is fed to the gate of the MOS transistor T6, and a signal ϕVPS is fed to the source of the MOS transistor T1. In this embodiment, the signal ϕVPS is a ternary signal that takes one of three predetermined levels, i.e. a low level, a high level, or an intermediate level, at a time. Here, a high level is, for example, a voltage approximately equal to the direct-current voltage VPD, a low level is, for example, a voltage equal to the ground level, and an intermediate level is a voltage that is intermediate between those two voltages and that causes the MOS transistor T1 to operate in a subthreshold region. An intermediate level is, for example, a voltage approximately equal to the direct-current voltage VPS.

(1) How to Convert the Light Incident on the Individual Pixels into an Electric Signal In this pixel configured as described above, image sensing is achieved in the following manner. First, the signal ϕS is turned to a high level to bring the MOS transistor T6 into a conducting state, Moreover, the signal ϕVPS is turned to an intermediate level so as to bias the MOS transistor T1 in such a way that the MOS transistor T1 operates in a subthreshold region. Furthermore, the signal ϕVRB fed to the capacitor C1 is turned to a low level. When the levels of these signals are set as described above, the pixel of this embodiment has a circuit configuration quite similar to that of the fourth embodiment (FIG. 13).

In this state, when the signal 1D is turned to a high level, an electric charge equivalent to the value obtained by converting the integral of the photoelectric current natural-logarithmically is accumulated in the capacitor C2. Then, with predetermined timing, the MOS transistor T3 is turned on so that a current proportional to the voltage applied to the gate of the MOS transistor T4, i.e. the voltage at the node "a", is fed through the MOS transistors T3 and T4 to the output signal line 6. After this current signal obtained by converting the photoelectric current natural-logarithmically has been output in this way, the MOS transistor T3 is turned off.

(2) How to Reset the Individual Pixels

Figure 16:
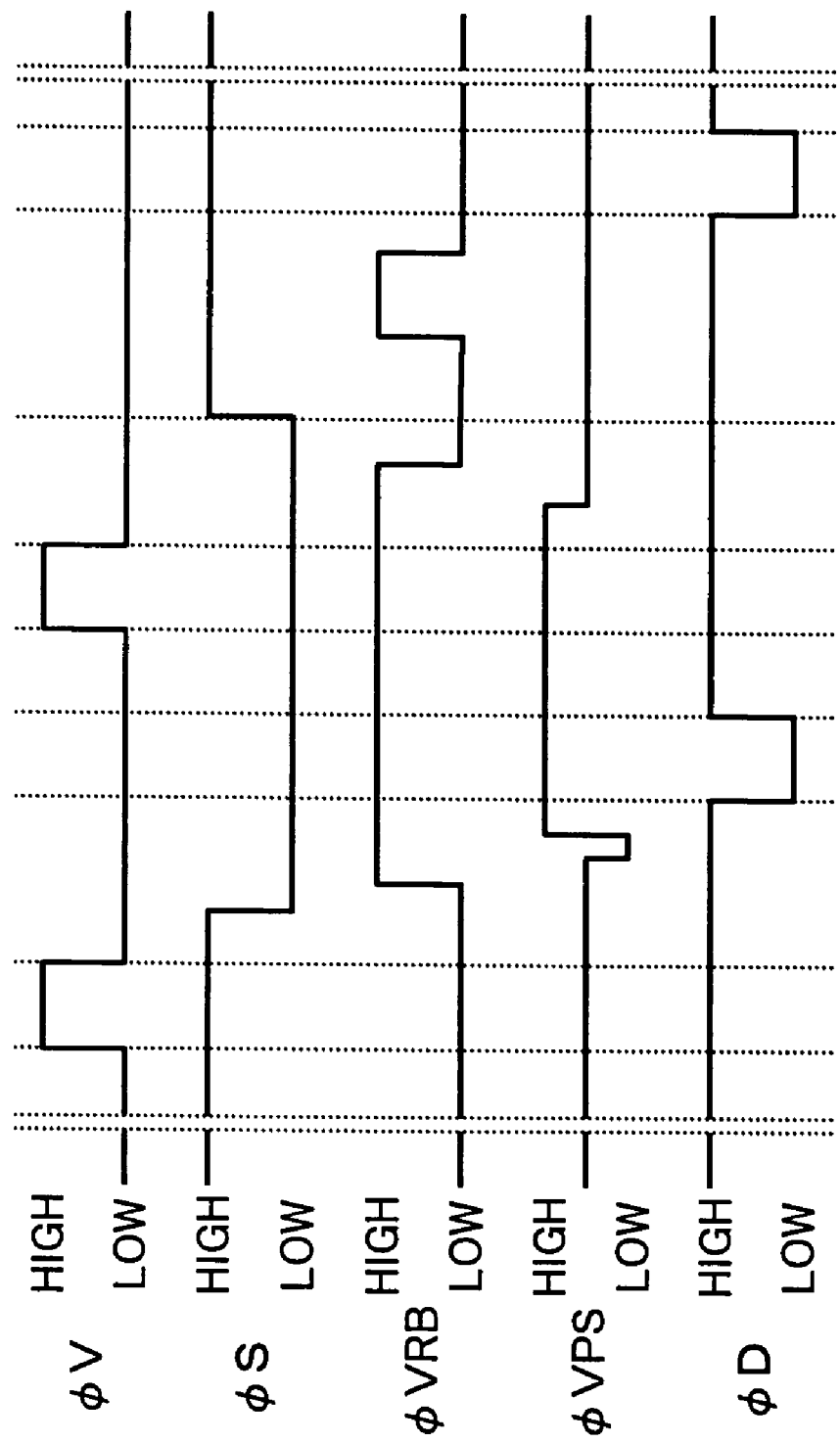
FIG. 16 is a timing chart of the signals fed to each pixel in the sixth embodiment.
Figure 17A:
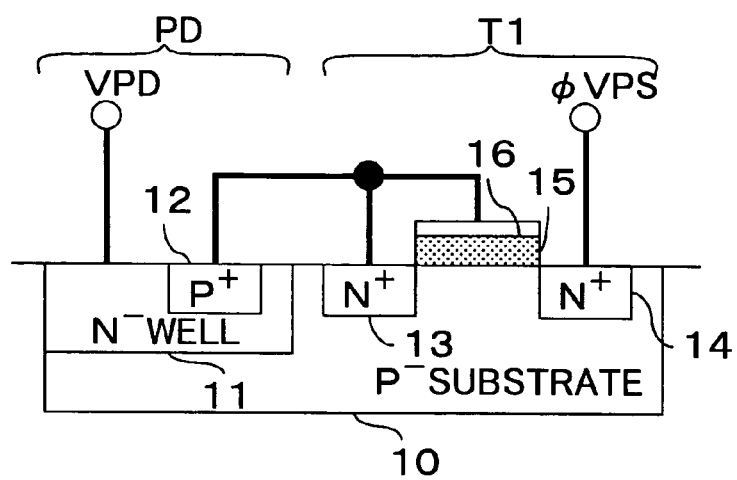
FIGS. 17A to 17C are diagrams showing the potential relationship observed during variation detection.
Figure 17B:
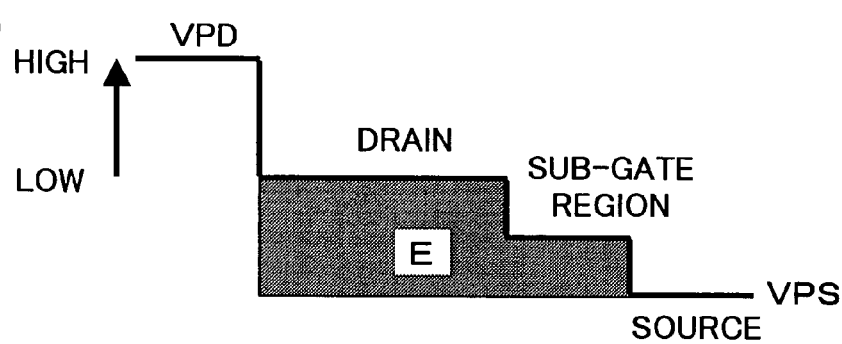
Figure 17C:
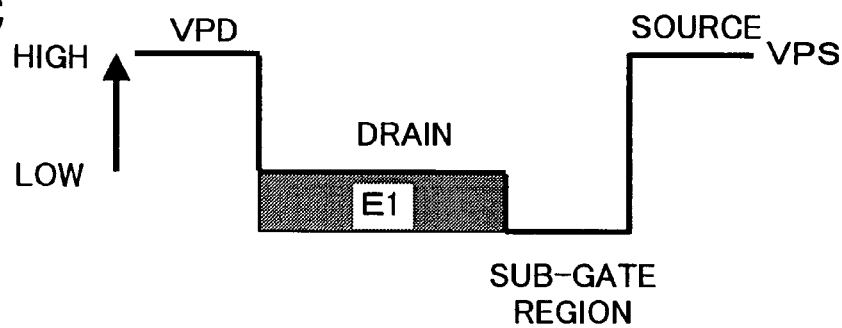

Now, how the resetting of the pixel is achieved will be described with reference to the timing chart shown in FIG. 16 and the potential transition diagrams shown in FIGS. 17B and 17C. In FIGS. 17B and 17C, the arrow at the left indicates the direction in which the potential increases. FIG. 17A is a sectional view, like FIGS. 5A and 8A, showing the structure of the photodiode PD and the MOS transistor T1. Resetting starts after the feeding of the pulse signal ϕV. First, the signal ϕS is turned to a low level to bring the MOS transistor T6 into a non-conducting state, and then the signal ϕVRB is turned to a high level. In this state, when the voltage of the signal ϕVPS is turned to a low level, the potentials in the MOS transistor T1 come to have a relationship as shown in FIG. 17B, causing a negative electric charge to flow into the MOS transistor T1 via the source thereof.

After this negative electric charge E having flown into the MOS transistor T1 has been accumulated therein as shown in FIG. 17B, the signal ϕVPS is turned to a high level approximately equal to the direct-current voltage VPD. This makes the potential at the source of the MOS transistor T1 higher than the potential at the sub-gate region thereof, and thus causes part of the accumulated negative electric charge E to flow out of the MOS transistor T1 via the source thereof. As a result, as shown in FIG. 17C, now the negative electric charge E1 remains accumulated at the drain of the MOS transistor T1, at the anode of the photodiode PD, and at the gate of the MOS transistor T2. Now that the negative electric charge E1 remains accumulated in this way, the gate voltage of the MOS transistor T2 is determined by the negative electric charge E1. Since the negative electric charge E1 is determined by the threshold voltage between the drain and gate of the MOS transistor T1, the gate voltage of the MOS transistor T2 is determined by the threshold voltage of the MOS transistor T1.

With this state maintained, the signal ϕD is turned to a low level so as to reset the capacitor C2 once. Then, the signal ϕD is turned back to a high level so that the capacitor C2 is charged with a current sampled by the gate voltage of the MOS transistor T2. Then, by feeding the pulse signal ϕV, the voltage appearing at the node "a" as a result of the capacitor C2 being charged in this way is subjected to current amplification by the MOS transistor T4 and is then fed, as the output signal, through the MOS transistor T3 to the output signal line 6.

The detection of variations in sensitivity itself takes only a very short time, and therefore, in the process described above, the photodiode does not necessarily have to be prevented from exposure to light during the detection of variations. However, it is preferable that the photodiode be prevented at least from exposure to light so intense as to affect the detection of variations in threshold values. Although it is preferable to keep the photodiode in a dark state, it suffices to keep the photodiode in ambient light as long as there is no risk of exposure to extremely intense light. This prevents the photodiode from generating an unnecessary electric signal, and thereby makes it possible to detect variations more accurately. This applies to all of the embodiments described hereafter.

After the signal having the value proportional to the threshold voltage of the MOS transistor T1, of which the variation leads to variations in sensitivity of the individual pixels, has been output in this way, the signal φVPS is turned to a low level and the signal φVRB is turned to an intermediate level. Subsequently, the signal φS is turned to a high level to bring the MOS transistor T6 into a conducting state, and then, as in the fourth embodiment (FIG. 13), the signal φVRB is turned to a high level and then back to a low level so as to reset the MOS transistor T1 quickly. Then, by turning the signal φD to a low level and then back to a high level, the capacitor C2 is reset.

Figure 36:
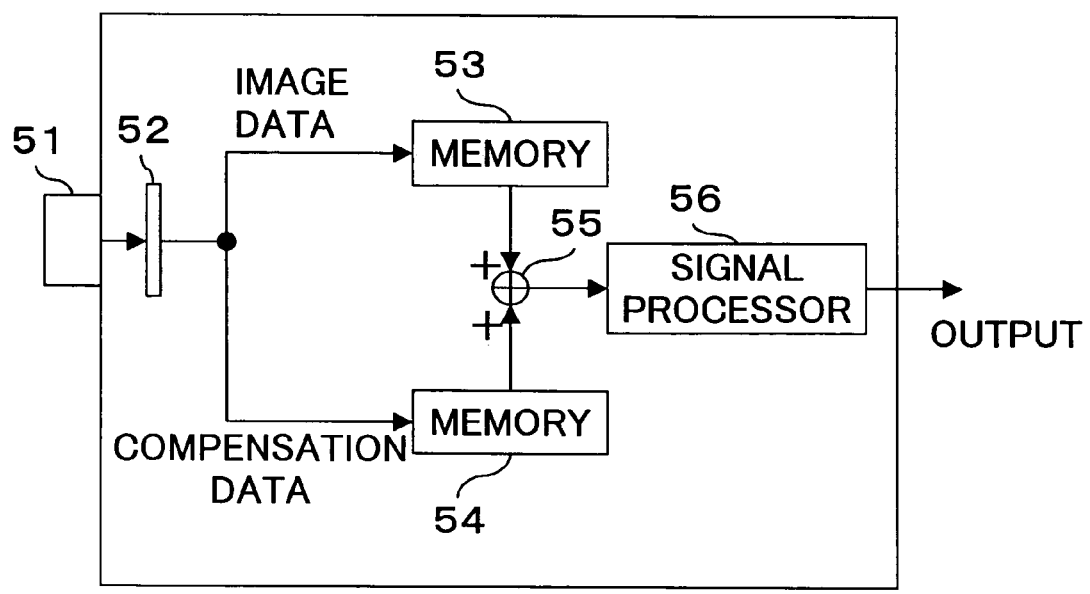
FIG. 36 is a block diagram showing the internal configuration of an image input apparatus provided with a solid-state image-sensing device having pixels configured according to one of the embodiments of the invention.
Figure 37:
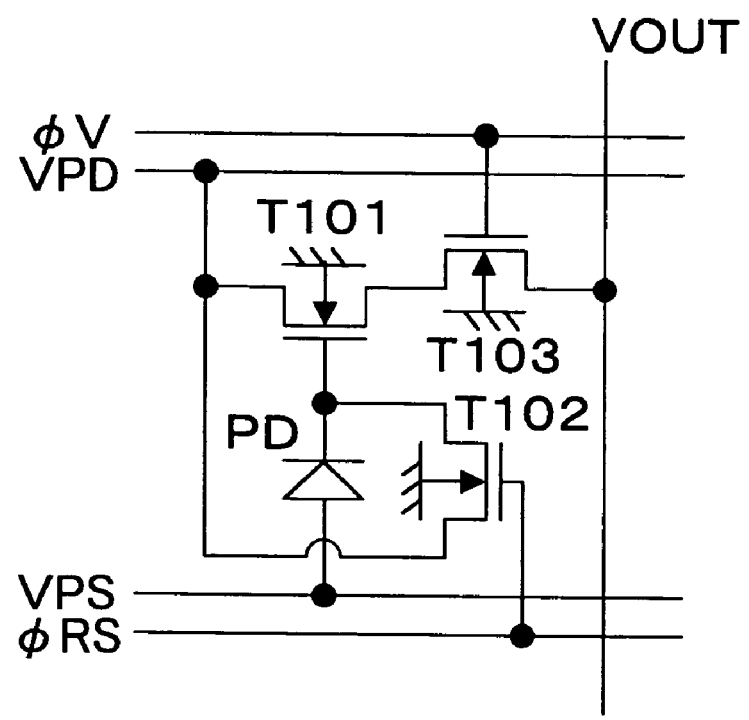
FIG. 37 is a circuit diagram showing the configuration of each pixel in a conventional solid-state image-sensing device.

In this way, according to the pixel configuration of this embodiment, after image sensing by the individual pixels, it is possible to acquire, as compensation data for correcting the outputs from the individual pixels, signals proportional to the threshold voltage of the MOS transistor of the individual pixels, of which the variation leads to variations in sensitivity of the individual pixels. For example, not only is the image data obtained from the individual pixels during image sensing output to the succeeding circuit so as to be stored pixel by pixel in a memory provided therein, but also the current proportional to the threshold voltage of the MOS transistor of one pixel after another is output serially by way of the signal line 9 shown in FIG. 9 to the succeeding circuit so as to be stored pixel by pixel as compensation data in another memory provided therein. Then, by correcting pixel by pixel the image data with the corresponding compensation data, it is possible to eliminate components resulting from variations in sensitivity of the individual pixels from the output signal. A practical example of how this compensation is achieved is shown in FIG. 36 and will be described later.

Seventh Embodiment

Figure 18:
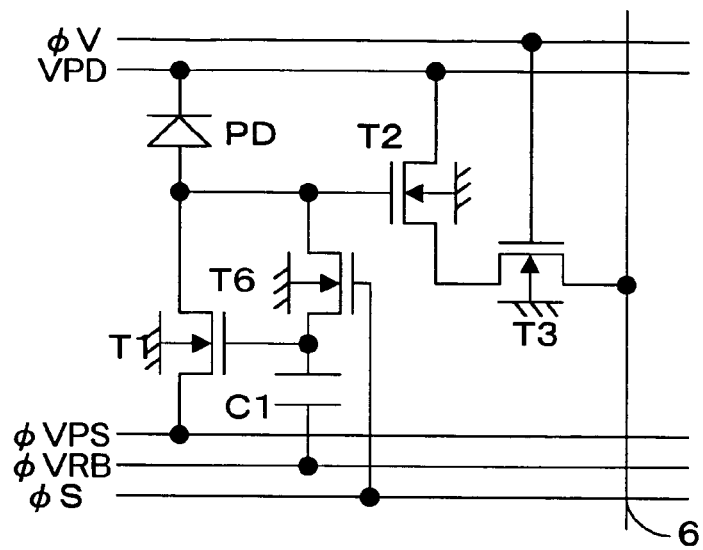
FIG. 18 is a circuit diagram showing the configuration of each pixel in a seventh embodiment of the invention.

Next, a seventh embodiment of the invention will be described with reference to the drawings. FIG. 18 is a circuit diagram showing the configuration of each pixel of the solid-state image-sensing device of this embodiment. It is to be noted that such elements, signal lines, and others as are used for the same purposes here as in the pixel shown in FIG. 15 are identified with the same reference symbols, and their detailed descriptions will be omitted.

As shown in FIG. 18, in this embodiment, the voltage VPD is applied to the drain of the MOS transistor T2, and the capacitor C2 and the MOS transistor T4 are omitted. In other respects, each pixel of this embodiment is configured in the same manner as in the sixth embodiment (FIG. 15).

Thus, this embodiment is to the sixth embodiment what the fifth embodiment (FIG. 14) is to the fourth embodiment (FIG. 13). Accordingly, the photodiode PD, the MOS transistors T1, T2, T3, and T6, and the capacitor C1 operate in the same manner as in the sixth embodiment to achieve image sensing and resetting. The output signal is obtained, as in the fifth embodiment, as a result of the current flowing out of the MOS transistor T2 being fed, as the output current, through the MOS transistor T3 to the output signal line 6. At this time, the drain voltage of the MOS transistor Q1 (FIG. 9), which is determined by the on-state resistances of the MOS transistors T2 and Q1 and the current flowing therethrough, appears as the output signal on the output signal line 6. After this output signal has been read, the MOS transistor T3 is turned off.

Eighth Embodiment

Figure 19:
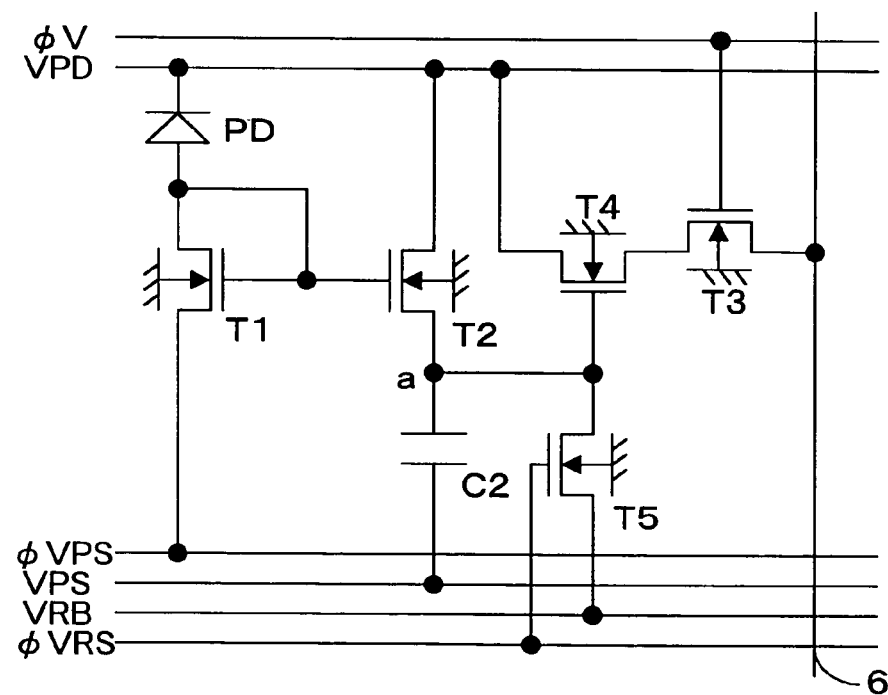
FIG. 19 is a circuit diagram showing the configuration of each pixel in an eighth embodiment of the invention.

Next, an eighth embodiment of the invention will be described with reference to the drawings. FIG. 19 is a circuit diagram showing the configuration of each pixel of the solid-state image-sensing device of this embodiment. It is to be noted that such elements, signal lines, and others as are used for the same purposes here as in the pixel shown in FIG. 11 are identified with the same reference symbols, and their detailed descriptions will be omitted.

As shown in FIG. 19, in this embodiment, a signal φVPS is fed to the source of the MOS transistor T1, and the capacitor C1 is omitted. In other respects, each pixel of this embodiment is configured in the same manner as in the third embodiment (FIG. 11). The signal φVPS is a binary signal that takes one of two predetermined levels, i.e. either a low level or a high level, at a time. Here, a high level refers to a voltage that is approximately equal to the direct-current voltage VPS and that causes the MOS transistor T1 to operate in a subthreshold region, and a low level refers to a voltage that is lower than that and that brings the MOS transistor T1 into a conducting state.

(1) How to Convert the Light Incident on the Individual Pixels into an Electric Signal In this embodiment, as in the second embodiment (FIG. 6), by turning the voltage of the signal φVPS to a high level so that the MOS transistor T1 operates in a subthreshold region, it is possible to output to the output signal line 6 an output signal obtained by logarithmically converting the photoelectric current output from the photodiode PD in accordance with the amount of incident light. Now, a description will be given of how the individual circuit elements of the pixel shown in FIG. 19 operate when the output signal is produced by converting the photoelectric current logarithmically.

When light enters the photodiode PD, a photoelectric current is generated therein, and, due to the subthreshold characteristics of MOS transistors, a voltage having the value obtained by converting the photoelectric current natural-logarithmically appears at the gates of the MOS transistors T1 and T2. This voltage causes a current to flow through the MOS transistor T2, and, as a result, an electric charge that is equivalent to the value obtained by converting the integral of the photoelectric current natural-logarithmically is accumulated in the capacitor C2. That is, a voltage proportional to the value obtained by converting the integral of the photoelectric current natural-logarithmically appears at the node "a" between the capacitor C2 and the source of the MOS transistor T2. Here, the MOS transistors T3 and T5 are off.

Next, the pulse signal φV is fed to the gate of the MOS transistor T3 to turn this MOS transistor T3 on. This causes a current proportional to the voltage applied to the gate of the MOS transistor T4 to be fed through the MOS transistors T3 and T4 to the output signal line 6. Here, the voltage applied to the gate of the MOS transistor T4 is equal to the voltage appearing at the node "a", and therefore the current thus fed to the output signal line 6 has the value obtained by converting the integral of the photoelectric current natural-logarithmically. In this way, a signal (output current) proportional to the logarithm of the amount of incident light is read, and thereafter the MOS transistor T3 is turned off.

(2) How to Reset the Individual Pixels

Figure 20:
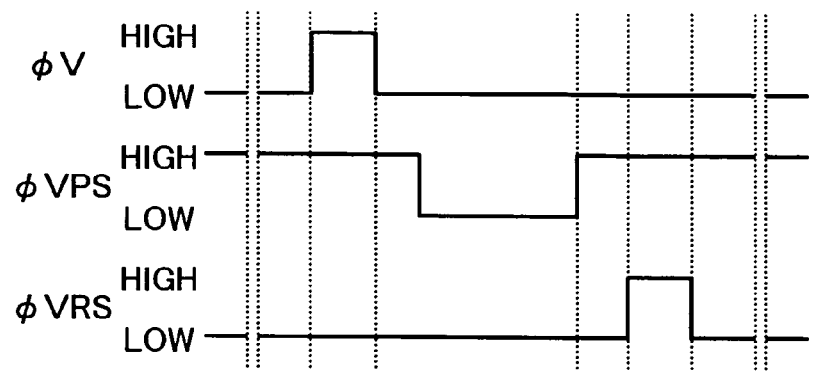
FIG. 20 is a timing chart of the signals fed to each pixel in the eighth embodiment.

Now, how resetting is achieved in the pixel having the circuit configuration shown in FIG. 19 will be described with reference to the drawings. FIG. 20 is a timing chart of the signals fed to the signal lines connected to the individual circuit elements constituting each pixel during resetting. As described under (1) above, in the pixel having the circuit configuration shown in FIG. 19, when the pulse signal φV is fed to the gate of the MOS transistor T3, an electric signal (output signal) obtained by converting the amount of incident light logarithmically is output to the output signal line 6. After this output signal has been output, the pulse signal φV turns to a low level, and resetting starts. In this embodiment, the relationship of the potentials in the MOS transistor T1 during resetting is the same as in the second embodiment, i.e. as shown in FIGS. 8B to 8E. Now, how this resetting is achieved will be described with reference to FIGS. 8A to 8E and 19.

As described above, after the output signal has been output as a result of the pulse signal φV being fed to the gate of the MOS transistor T3, resetting starts. When resetting starts, as in the second embodiment, a negative electric charge flows into the MOS transistor T1 via the source thereof, causing the potentials in the MOS transistor T1 to have a relationship as shown in FIG. 8B.

Next, the signal φVPS fed to the source of the MOS transistor T1 is turned to a low level so as to bring the MOS transistor T1 into a conducting state as shown in FIG. 8C. This increases the amount of negative electric charge that flows into the MOS transistor T1 via the source thereof, and thereby permits quick recombination of the positive electric charges accumulated at the gate and drain of the MOS transistor T1, at the gate of the MOS transistor T2, and at the anode of the photodiode PD.

As a result, as shown in FIG. 8D, the potentials at the drain and sub-gate region of the MOS transistor T1 become lower. When the potentials in the MOS transistor T1 have changed in this way, the signal φVPS fed to the source of the MOS transistor T1 is turned to a high level. This causes the potentials in the MOS transistor T1 to have a relationship as shown in FIG. 8E, and thus causes those potentials to be reset to their original levels. After the potentials in the MOS transistor T1 have been reset to their original levels in this way, the pulse signal φVRS is fed to the gate of the MOS transistor T5 so that the capacitor C2 is discharged through the MOS transistor T5 and thereby the potential at the node "a" is reset to its original level.

Ninth Embodiment

Figure 21:
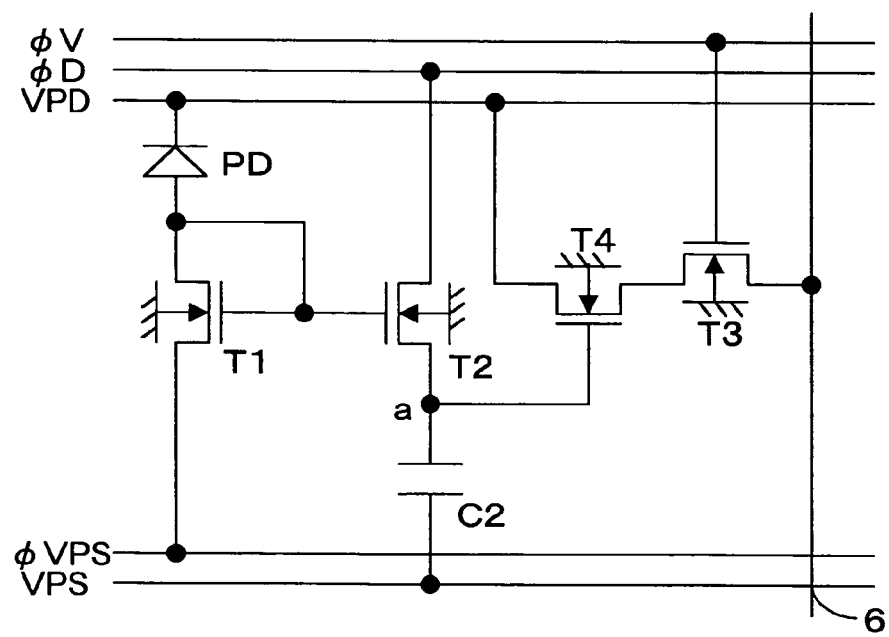
FIG. 21 is a circuit diagram showing the configuration of each pixel in a ninth embodiment of the invention.

Next, a ninth embodiment of the invention will be described with reference to the drawings. FIG. 21 is a circuit diagram showing the configuration of each pixel of the solid-state image-sensing device of this embodiment. It is to be noted that such elements, signal lines, and others as are used for the same purposes here as in the pixel shown in FIG. 19 are identified with the same reference symbols, and their detailed descriptions will be omitted.

As shown in FIG. 21, in this embodiment, the initialization of the potential at the capacitor C2, and thus at the node "a", is achieved by feeding the signal φD to the drain of the MOS transistor T2, and thus the MOS transistor T5 is omitted. In other respects, each pixel of this embodiment is configured in the same manner as in the eighth embodiment (FIG. 19). Here, as in the second embodiment (FIG. 6), while the signal φD is kept at a high level, the capacitor C2 performs integration; while the signal φD is kept at a low level, the electric charge accumulated in the capacitor C2 is discharged through the MOS transistor T2 to make the voltage at the capacitor C2, and thus at the gate of the MOS transistor T4, approximately equal to the low-level voltage of the signal φD (that is, the voltage is reset). In this embodiment, the omission of the MOS transistor T5 helps simplify the circuit configuration.

In this embodiment, image sensing is achieved in the following manner. As in the eighth embodiment, the signal φVPS fed to the source of the MOS transistor T1 is turned to a high level so that the MOS transistor T1 operates in a subthreshold region. Moreover, the signal φD is turned to a high level so that an electric charge equivalent to the value obtained by converting the integral of the photoelectric current natural-logarithmically is accumulated in the capacitor C2. Then, with predetermined timing, the MOS transistor T3 is turned on so that a current proportional to the voltage applied to the gate of the MOS transistor T4 is fed through MOS transistors T3 and T4 to the output signal line 6.

On the other hand, resetting of the pixel is achieved by controlling the signals with the timing shown in FIG. 7 as in the second embodiment. Specifically, as in the second embodiment, resetting starts after the feeding of the pulse signal φV. Then, the signal φVPS fed to the source of the MOS transistor T1 is turned to a low level to bring the MOS transistor T1 into a conducting state. This increases the amount of negative electric charge that flows into the MOS transistor T1 via the source thereof, and thereby permits, as in the second embodiment, quick recombination of the positive electric charges accumulated at the gate and drain of the MOS transistor T1, at the gate of the MOS transistor T2, and at the anode of the photodiode PD.

Then, the signal φVPS fed to the source of the MOS transistor T1 is turned to a high level so as to reset the potentials in the MOS transistor T1 to their original levels. After the potentials in the MOS transistor T1 have been reset to their original levels in this way, the voltage of the signal φD is turned to a low level so as to discharge the capacitor C2 and thereby reset the potential at the node "a" to its original level. Thereafter, the voltage of the signal φD is turned back to a high level in preparation for image sensing.

Tenth Embodiment

Figure 22:
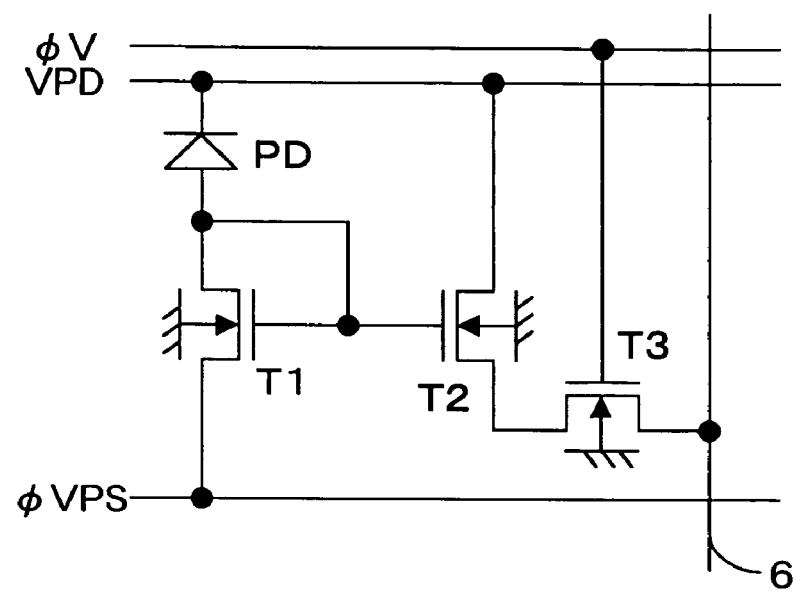
FIG. 22 is a circuit diagram showing the configuration of each pixel in a tenth embodiment of the invention.

Next, a tenth embodiment of the invention will be described with reference to the drawings. FIG. 22 is a circuit diagram showing the configuration of each pixel of the solid-state image-sensing device of this embodiment. It is to be noted that such elements, signal lines, and others as are used for the same purposes here as in the pixel shown in FIG. 21 are identified with the same reference symbols, and their detailed descriptions will be omitted.

As shown in FIG. 22, in this embodiment, the direct-current voltage VPD is applied to the drain of the MOS transistor T2, and the capacitor C2 and the MOS transistor T4 are omitted. That is, the MOS transistor T2 has its source connected to the drain of the MOS transistor T3. In other respects, each pixel of this embodiment is configured in the same manner as in the ninth embodiment (FIG. 21).

In this pixel configured as described above, image sensing is achieved in the following manner. As in the ninth embodiment, the signal φVPS fed to the source of the MOS transistor T1 is turned to a high level so that the MOS transistor T1 operates in a subthreshold region. By making the MOS transistor T1 operate in this way, a current having the value natural-logarithmically proportional to the photoelectric current flows through the MOS transistor T2 as its drain current.

Then, the pulse signal φV is fed to the gate of the MOS transistor T3 to turn on this MOS transistor T3. This causes a current having the value natural-logarithmically proportional to the photoelectric current to be fed through the MOS transistor T3, as its drain current, to the output signal line 6. At this time, the drain voltage of the MOS transistor Q1 (FIG. 9), which is determined by the on-state resistances of the MOS transistors T2 and Q1 and the current flowing therethrough, appears as the output signal on the output signal line 6. After this output signal has been read, the MOS transistor T3 is turned off.

On the other hand, resetting of the pixel is achieved in the following manner. As in the ninth embodiment, resetting starts after the feeding of the pulse signal φV. Then, the signal φVPS fed to the source of the MOS transistor T1 is turned to a low level so as to bring the MOS transistor T1 into a conducting state. This increases the amount of negative electric charge that flows into the MOS transistor T1 via the source thereof.

As a result, as in the second embodiment, recombination of the positive electric charges accumulated at the gate and drain of the MOS transistor T1, at the gate of the MOS transistor T2, and at the anode of the photodiode PD is achieved quickly. Then, the signal φVPS applied to the source of the MOS transistor T1 is turned to a high level so as to reset the potentials in the MOS transistor T1 to their original levels. In this way, the potentials in the MOS transistor T1 are reset to their original levels to make the pixel ready for image sensing again.

In this embodiment, it is not necessary to perform integration of the photoelectric signal by the use of a capacitor C2 as performed in the ninth embodiment described above, and thus no time is required for such integration, nor is it necessary to reset the capacitor C2. This ensures accordingly faster signal processing. Moreover, as compared with the third embodiment, the capacitor C2 and the MOS transistor T4 can be omitted, and this helps further simplify the circuit configuration and reduce the pixel size.

In all of the first to tenth embodiments described thus far, the MOS transistors T1 to T6 provided within each pixel as active elements are all composed of N-channel MOS transistors; however, these MOS transistors T1 to T6 may be composed of P-channel MOS transistors instead. FIGS. 24, 25, and 28 to 35 show eleventh to twentieth embodiments, which are examples of modified versions of the first to tenth embodiments described above in which P-channel MOS are used. Accordingly, in FIGS. 23 to 35, all the elements used and the voltages applied have the opposite polarities. For example, in FIG. 24 (the eleventh embodiment), the direct-current voltage VPD is connected to the anode of the photodiode PD, and the cathode thereof is connected to the drain of the first MOS transistor T1 and to the gate of the second MOS transistor T2. The direct-current voltage VPS is applied to the source of the first MOS transistor T1.

Figure 24:
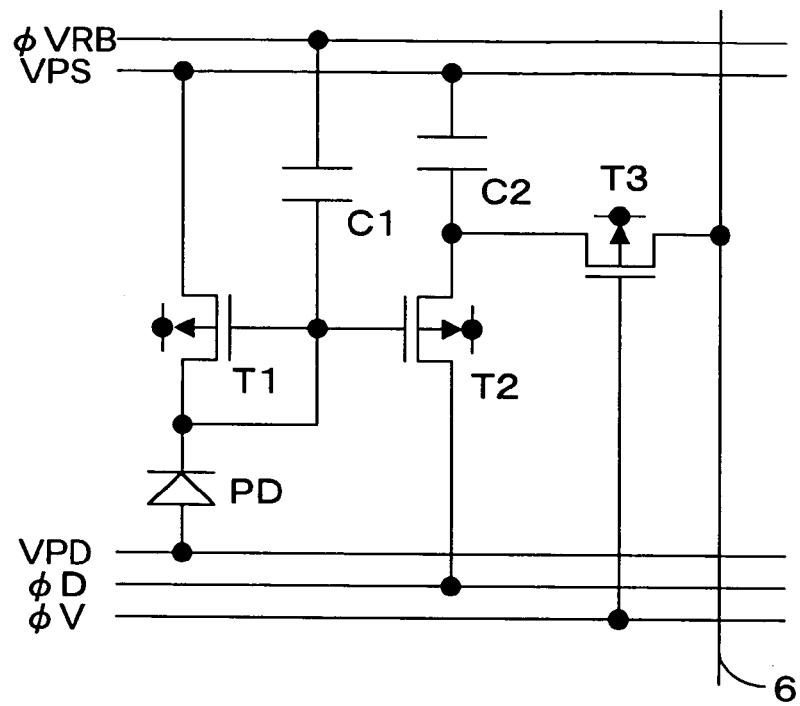
FIG. 24 is a circuit diagram showing the configuration of each pixel in an eleventh embodiment of the invention.
Figure 25:
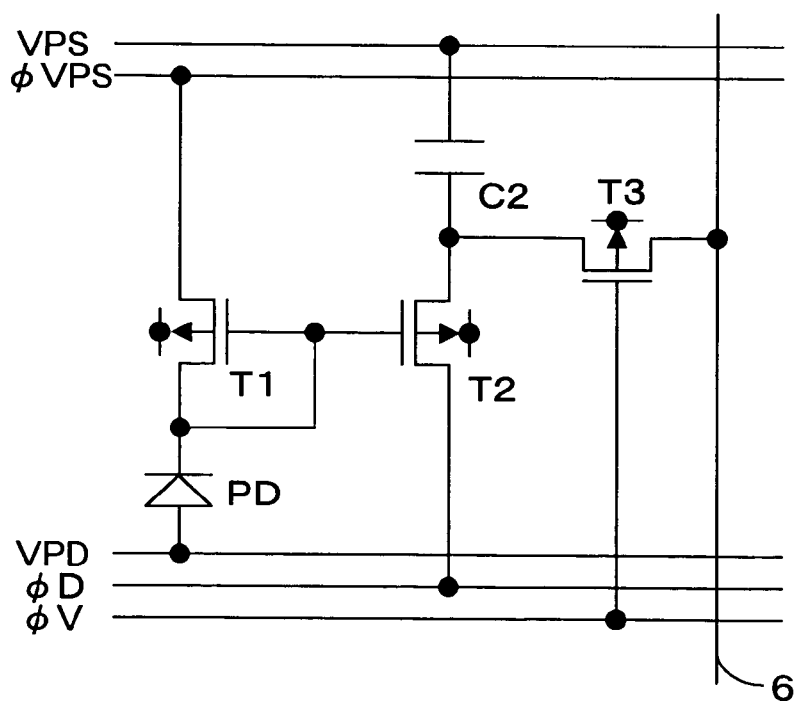
FIG. 25 is a circuit diagram showing the configuration of each pixel in a twelfth embodiment of the invention.

When logarithmic conversion is performed in a pixel as shown in FIG. 24, the direct-current voltage VPS and the direct-current voltage VPD fulfill the relation VPS>VPD, thus an inverted relation as compared with the case shown in FIG. 3 (the first embodiment). Moreover, the output voltage of the capacitor C2 is initially high, and drops as a result of integration. Moreover, when the third MOS transistor T3 is turned on, a low voltage is applied to the gate thereof. Furthermore, in the embodiments shown in FIG. 28 and the following figures (the thirteenth to twentieth embodiments), when the fifth or sixth MOS transistor T5 or T6 is turned on, a low voltage is applied to the gate thereof. As described above, in cases where P-channel MOS transistors are used, although how the voltages are applied and the elements are connected differs partially, the circuits are configured substantially in the same manner and operate basically in the same manner as in cases where N-channel MOS transistors are used. Therefore, with respect to the eleventh to twentieth embodiments, only illustrations are given in FIGS. 24, 25, and 28 to 35, and no descriptions will be given of their configuration and operation.

Figure 23:
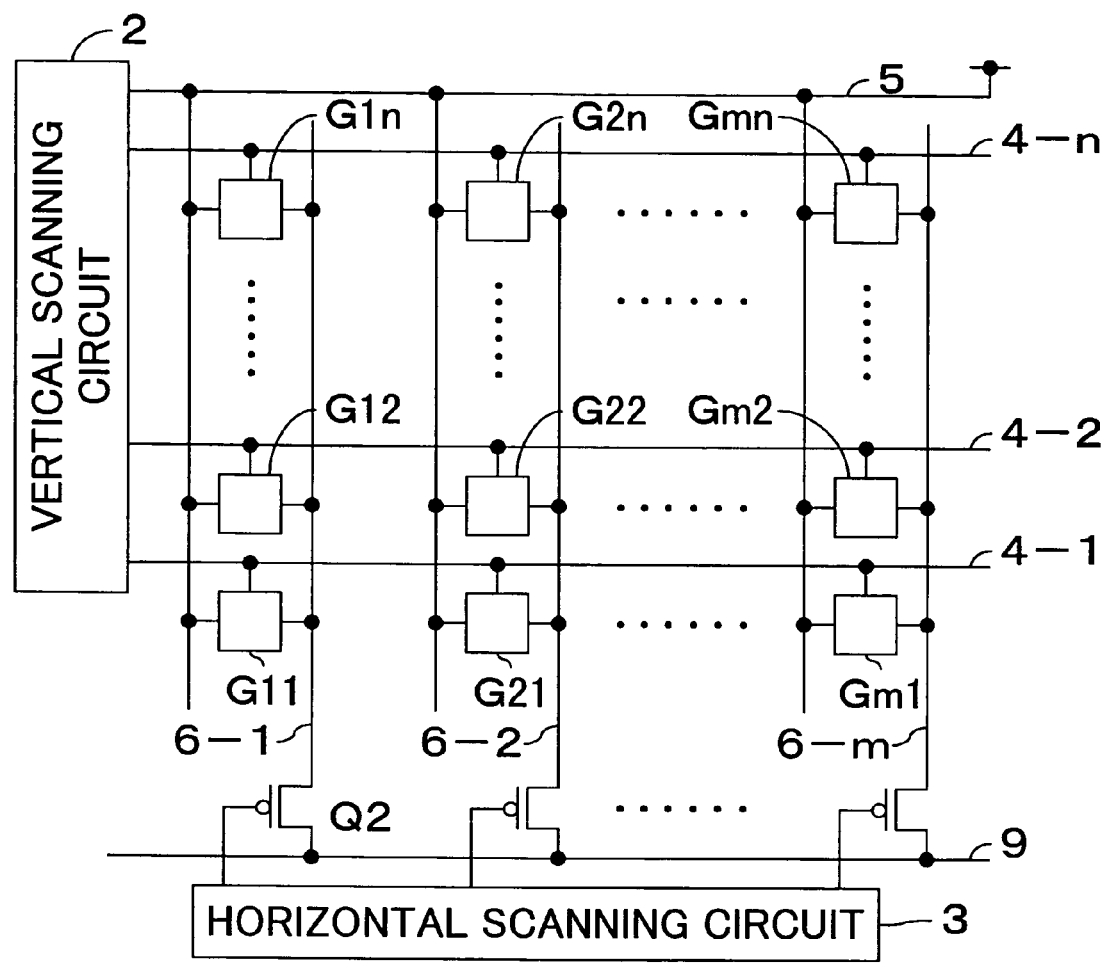
FIG. 23 is a block circuit diagram illustrating the overall configuration of a two-dimensional solid-state image-sensing device embodying the invention, in a case where the active elements within a pixel are composed of P-channel MOS transistors.
Figure 26:
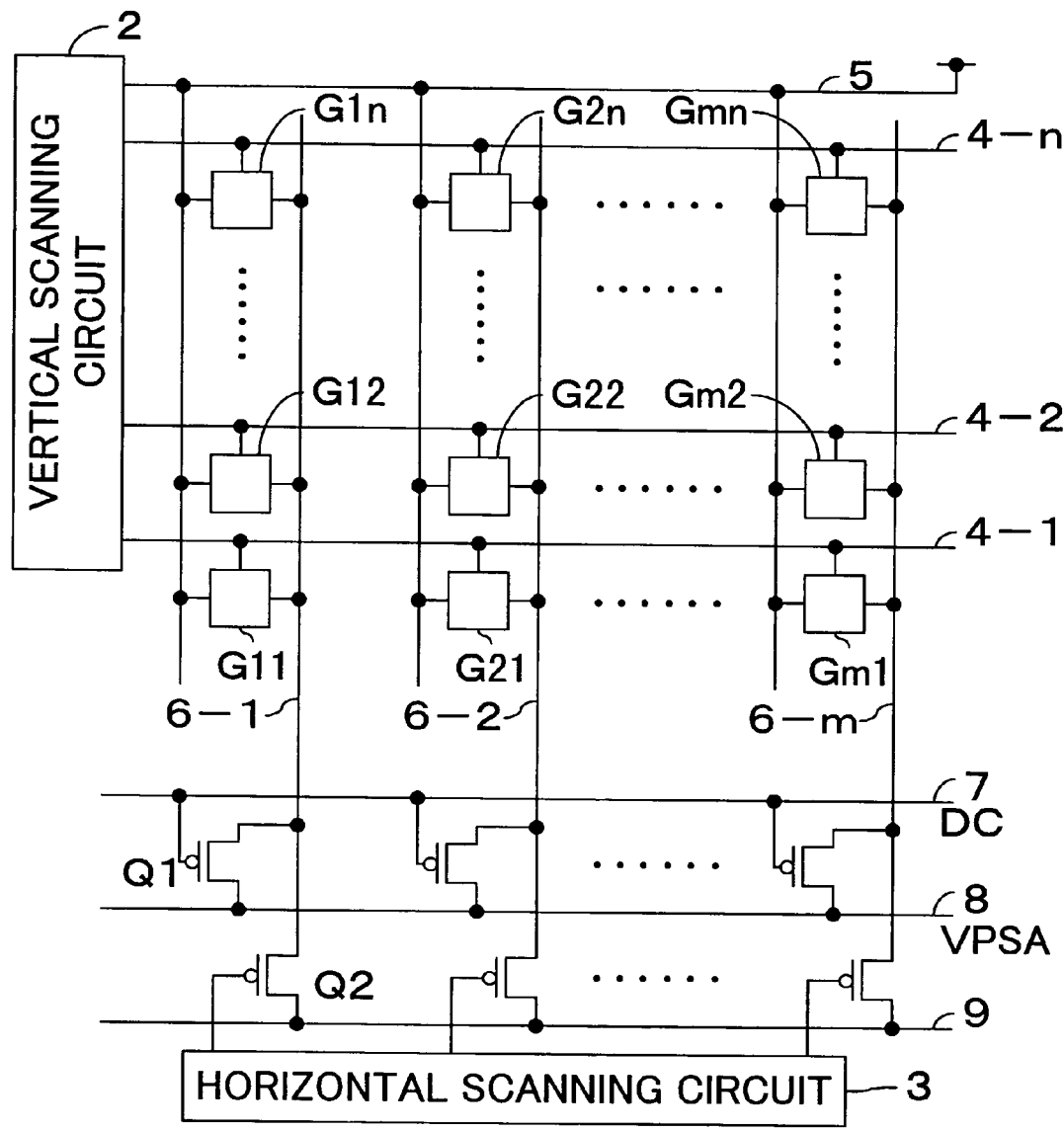
FIG. 26 is a block circuit diagram illustrating the overall configuration of another two-dimensional solid-state image-sensing device embodying the invention, in a case where the active elements within a pixel are composed of P-channel MOS transistors.

FIG. 23 is a block circuit configuration diagram illustrating the overall configuration of a solid-state image-sensing device having pixels configured according to the eleventh or twentieth embodiment, and FIG. 26 is a block circuit configuration diagram illustrating the overall configuration of a solid-state image-sensing device having pixels configured according to one of the thirteenth to twentieth embodiments. As to FIGS. 23 and 26, such elements as are found also (i.e. as play the same roles as) in FIGS. 2 and 9 are identified with the same reference symbols, and their descriptions will be omitted. Here, a brief description will be given of the configuration shown in FIG. 26. A P-channel MOS transistor Q1 and a P-channel MOS transistor Q2 are connected to each of output signal lines 6-1, 6-2, . . . , 6-m that are laid in the column direction. The MOS transistor Q1 has its gate connected to a direct-current voltage line 7, has its drain connected to the output signal line 6-1, and has its source connected to a direct-current voltage VPSA line 8.

Figure 27A:
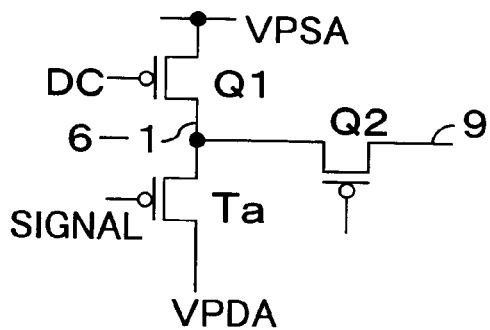
FIGS. 27A and 27B are circuit diagrams of a portion of the circuit shown in FIG. 26.

On the other hand, the MOS transistor Q2 has its drain connected to the output signal line 6-1, has its source connected to a signal line 9 serving as a final destination line, and has its gate connected to a horizontal scanning circuit 3. Here, the MOS transistor Q1, together with a P-channel MOS transistor Ta provided within each pixel, constitutes an amplifier circuit as shown in FIG. 27A. This MOS transistor Ta corresponds to the fourth MOS transistor T4 in the thirteenth, fourteenth, sixteenth, eighteenth, and nineteenth embodiments, and corresponds to the second MOS transistor T2 in the fifteenth, seventeenth, and twentieth embodiments.

Figure 27B:
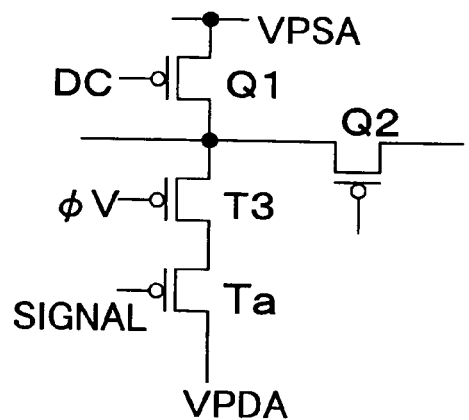
Figure 28:
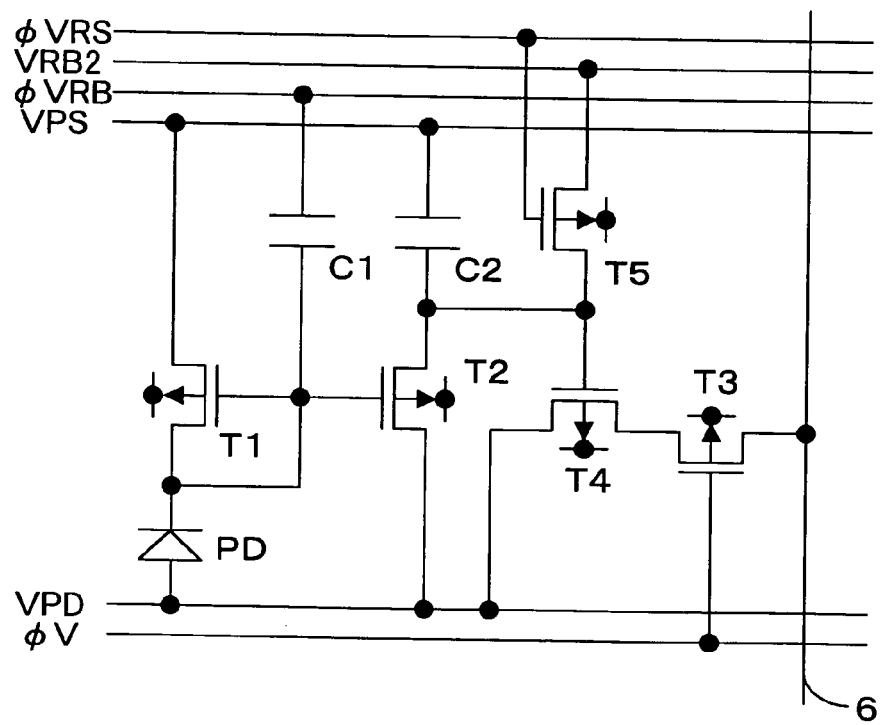
FIG. 28 is a circuit diagram showing the configuration of each pixel in a thirteenth embodiment of the invention.
Figure 29:
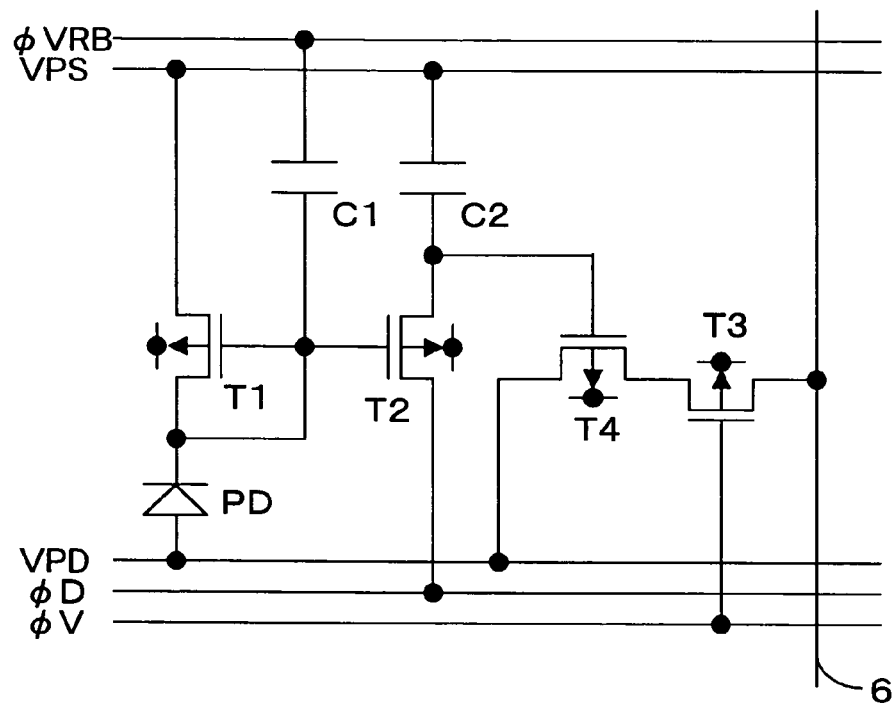
FIG. 29 is a circuit diagram showing the configuration of each pixel in a fourteenth embodiment of the invention.
Figure 30:
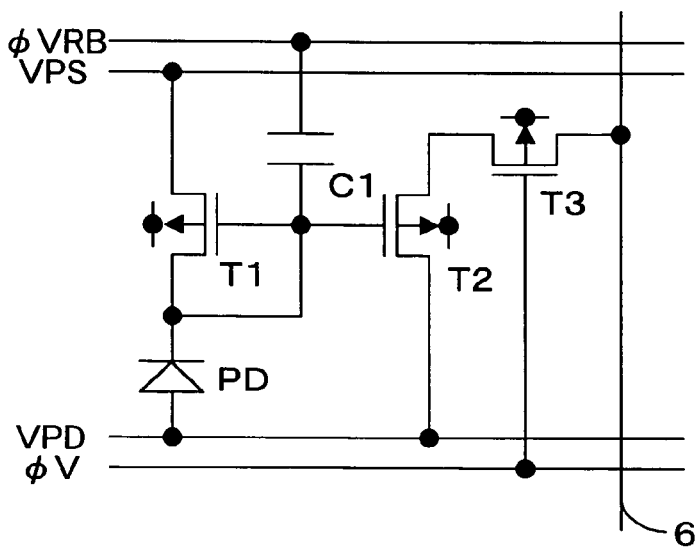
FIG. 30 is a circuit diagram showing the configuration of each pixel in a fifteenth embodiment of the invention.
Figure 31:
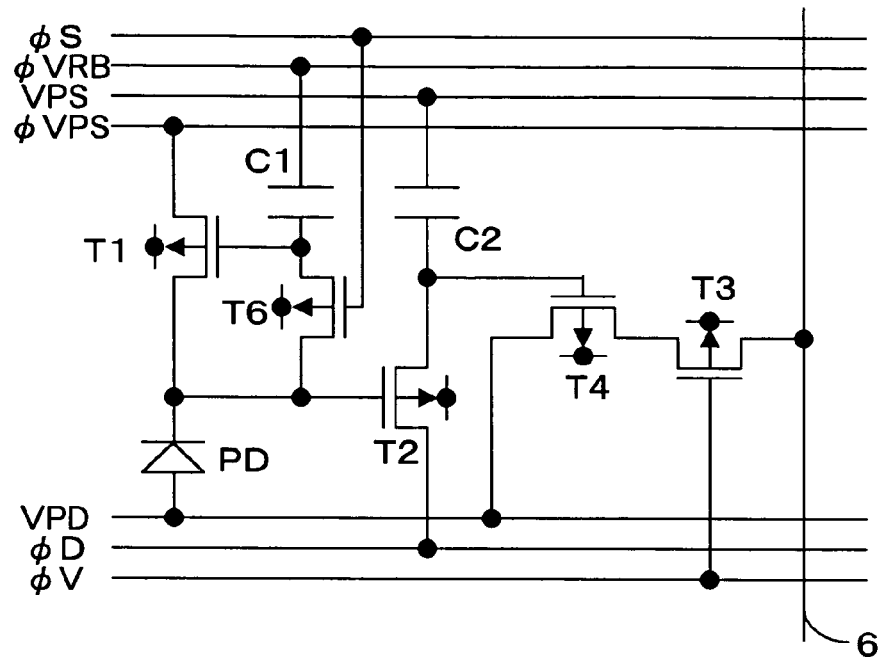
FIG. 31 is a circuit diagram showing the configuration of each pixel in a sixteenth embodiment of the invention.
Figure 32:
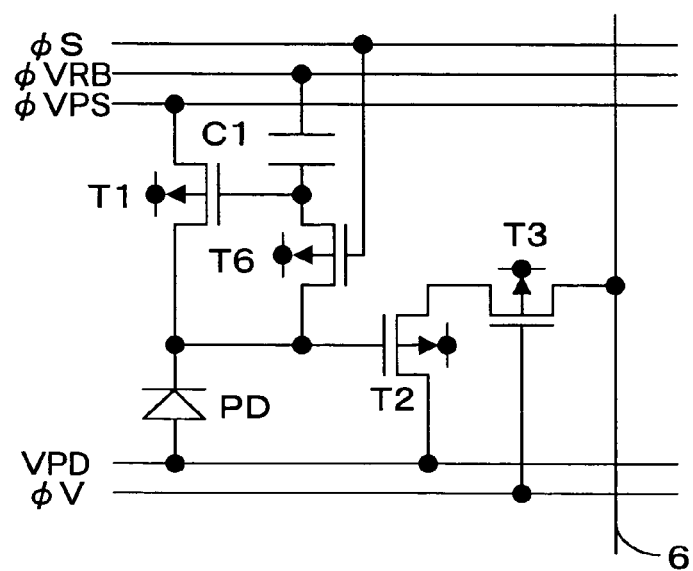
FIG. 32 is a circuit diagram showing the configuration of each pixel in a seventeenth embodiment of the invention.
Figure 33:
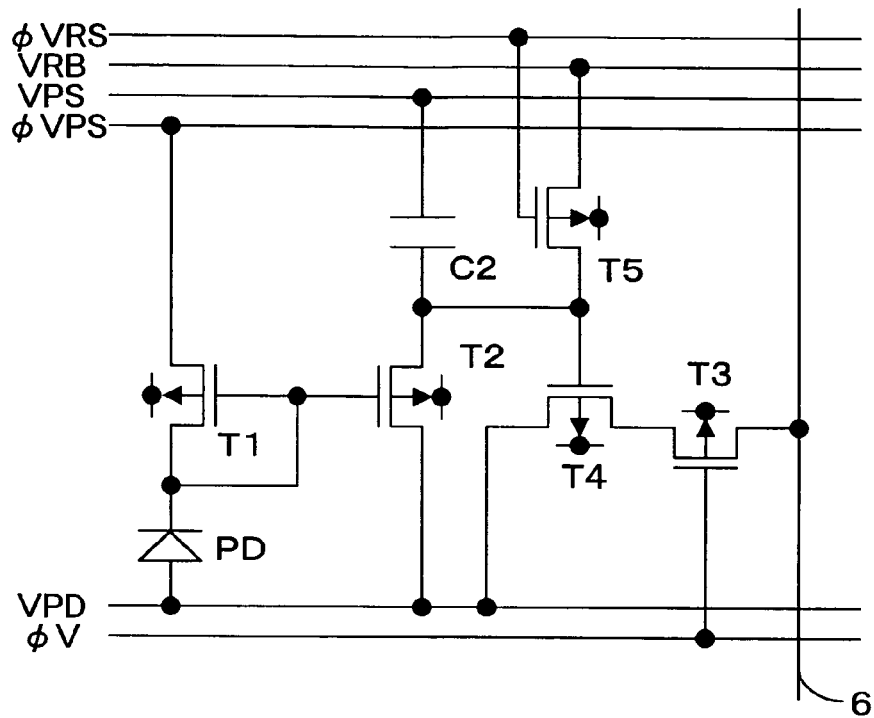
FIG. 33 is a circuit diagram showing the configuration of each pixel in an eighteenth embodiment of the invention.
Figure 34:
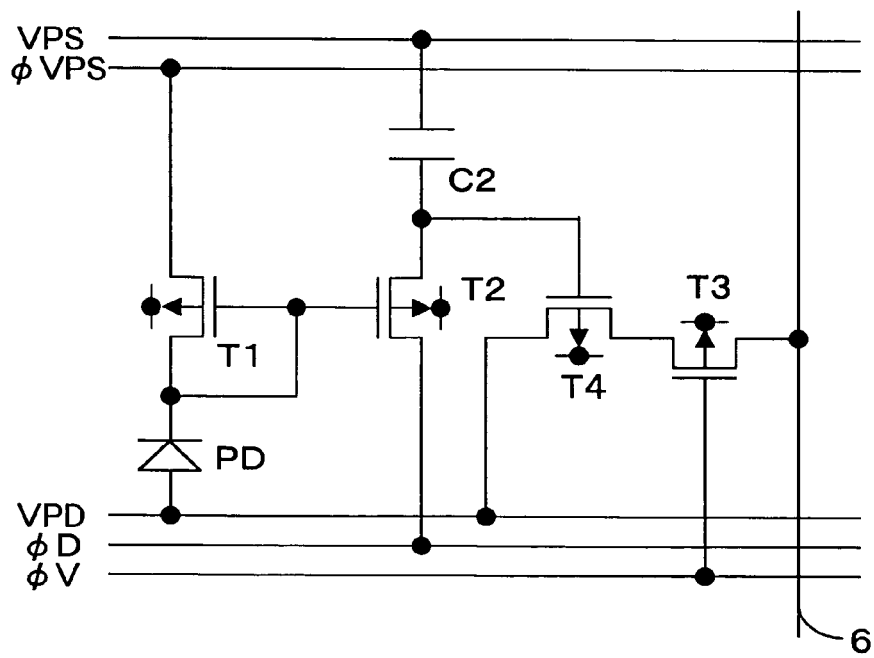
FIG. 34 is a circuit diagram showing the configuration of each pixel in a nineteenth embodiment of the invention.
Figure 35:
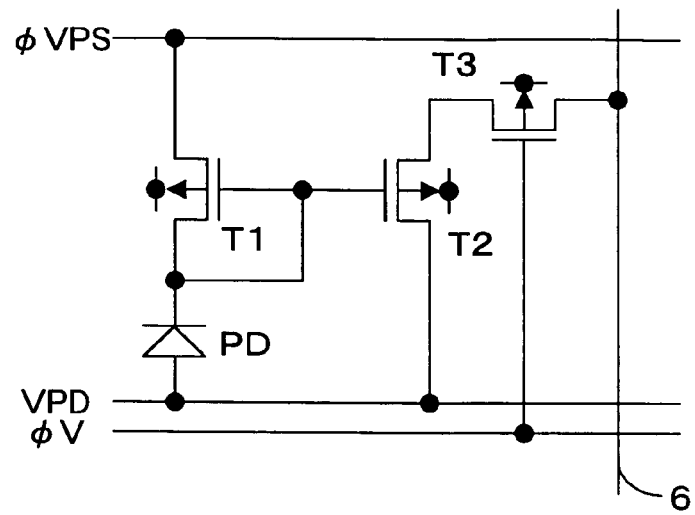
FIG. 35 is a circuit diagram showing the configuration of each pixel in a twentieth embodiment of the invention.

Here, the MOS transistor Q1 serves as a load resistor or constant-current source for the MOS transistor Ta. Accordingly, the direct-current voltage VPSA connected to the source of this MOS transistor Q1 and the direct-current voltage VPDA connected to the drain of the MOS transistor Ta fulfill the relation VPDA<VPSA, where the direct-current voltage VPDA is equal to, for example, the ground-level voltage. The MOS transistor Q1 has its drain connected to the MOS transistor Ta, and receives a direct-current voltage at its gate. The P-channel MOS transistor Q2 is controlled by the horizontal scanning circuit 3 so as to feed the output of the amplifier circuit to the signal line 9 that serves as the final destination line. If the third MOS transistor T3 provided within each pixel is explicitly illustrated, the circuit shown in FIG. 27A has a circuit configuration as shown in FIG. 27B.

How to Correct Image Data with Pixels of the First to Tenth Embodiments

Now, with reference to the drawings, an embodiment of the invention will be described in which a solid-state image-sensing device having pixels configured according to one of the sixth, seventh, sixteenth, and seventeenth embodiments described above is employed in an image input apparatus such as a digital camera.

The image input apparatus shown in FIG. 36 includes the following components. An objective lens 51 introduces the light from a subject into the image input apparatus. A solid-state image-sensing device 52 outputs an electric signal in accordance with the amount of light introduced through the objective lens 51. A memory 53 receives the electric signal (hereafter referred to as the "image data") output from the solid-state image-sensing device 52 during image sensing and stores it temporarily. Another memory 54 receives the electric signal (hereafter referred to as the "compensation data") output from the solid-state image-sensing device 52 during resetting and stores it temporarily. A compensation circuit 55 corrects the image data stored in the memory 53 in accordance with the compensation data stored in the memory 54 by performing predetermined compensation calculation. A signal processor 56 performs predetermined processing on the image data corrected in accordance with the compensation data by the compensation circuit 55 and feeds out the processed image data. Here, the solid-state image-sensing device 52 has pixels configured as in one of the sixth, seventh, sixteenth, and seventeenth embodiments (FIGS. 15, 18, 31, and 32).

This image input apparatus configured as described above operates as follows. First, image sensing is performed and image data is output pixel by pixel from the solid-state image-sensing device 52 to the memory 53. Then, after image sensing by the individual pixels, resetting is performed, and meanwhile, as described above, variations in sensitivity of the individual pixels are detected and output, as compensation data, to the memory 54. The image data stored in the memory 53 and the compensation data stored in the memory 54 are fed pixel by pixel to the compensation circuit 55. The compensation circuit 55 corrects the image data fed from the memory 53 in accordance with the compensation data fed from the memory 54 by performing predetermined compensation calculation between the image data and compensation data of corresponding pixels. The image data thus corrected is fed to the signal processor 56, which performs predetermined processing on this image data and then feeds it out. As the memories 53 and 54, there is no need to use frame memories, and it suffices to use line memories. This makes incorporation of these memories into the solid-state image-sensing device easy.

As described above, according to the present invention, it is possible to realize an image-sensing apparatus provided with a solid-state image-sensing device that permits quick resetting of individual pixels and that thus offers quick response in image sensing. This makes it possible to obtain images free from after-images even when a dimly-lit subject is shot. Moreover, using MOS transistors to form active elements makes high-density integration possible, and thus makes it possible to form them on a single chip together with peripheral processing circuits such as A/D converters, digital system processors, and memories.

What is claimed is:

1. An image-sensing apparatus comprising:
   a plurality of pixels, the pixels each including:
      a photodiode, having two electrodes, that produces an electric signal in accordance with amount of incident light;
      a first MOS transistor having a first electrode and a gate electrode connected to one electrode of the photodiode and a second electrode; and
      a second MOS transistor having a first electrode, a second electrode, and a gate electrode connected to the first and gate electrodes of the first MOS transistor;
      a third MOS transistor having a first electrode to which a direct-current voltage is applied, a second electrode, and a gate electrode connected to the second electrode of the second MOS transistor, the third MOS transistor amplifying a signal output from the second electrode of the second MOS transistor;
      a fourth MOS transistor having a first electrode connected to the second electrode of the third MOS transistor, a second electrode connected to an output signal line, and a gate electrode connected to a line select line; and
   a controller that makes the individual pixels perform image sensing in such a way that the electric signal output from the photodiode is converted natural-logarithmically by feeding a first voltage to the second electrode of the first MOS transistor so as to make the first MOS transistor operate in a subthreshold region below a threshold value thereof, wherein the controller resets the individual pixels by, in each pixel, feeding a second voltage to the second electrode of the first MOS transistor so as to permit a larger current to flow through the first MOS transistor than before feeding the second voltage thereto, and
   a capacitor having one end connected to the second electrode of the second MOS transistor, the capacitor being reset through the second MOS transistor when a reset voltage is fed to the first electrode of the second MOS transistor.

2. An image-sensing apparatus as claimed in claim 1, further comprising:
   MOS transistors connected to the individual pixels by way of output signal lines so as to serve as load resistors or constant-current sources.

3. An image-sensing apparatus as claimed in claim 1, wherein the pixels each further include a fifth MOS transistor having a first electrode connected to the second electrode of the second MOS transistor, a second electrode to which a direct-current voltage is applied, and a gate electrode;
   wherein the capacitor can be reset through the fifth MOS transistor when a reset voltage is fed to the gate electrode of the fifth MOS transistor.

4. An image-sensing apparatus comprising:
   a plurality of pixels, the pixels each including:
   a photodiode, having two electrodes, that produces an electric signal in accordance with amount of incident light;
   a first MOS transistor having a first electrode and a gate electrode connected to one electrode of the photodiode and a second electrode; and
   a second MOS transistor having a first electrode, a second electrode, and a gate electrode connected to the first and gate electrodes of the first MOS transistor;
   a third MOS transistor having a first electrode to which a direct-current voltage is applied, a second electrode, and a gate electrode connected to the second electrode of the second MOS transistor, the third MOS transistor amplifying a signal output from the second electrode of the second MOS transistor;
   a fourth MOS transistor having a first electrode connected to the second electrode of the third MOS transistor, a second electrode connected to an output signal line, and a gate electrode connected to a line select line;
   a capacitor having one end connected to the second electrode of the second MOS transistor; and
   a controller that makes the individual pixels perform image sensing in such a way that the electric signal output from the photodiode is converted natural-logarithmically by feeding a first voltage to the second electrode of the first MOS transistor so as to make the first MOS transistor operate in a subthreshold region below a threshold value thereof,
   wherein the controller resets the individual pixels by, in each pixel, feeding a second voltage to the second electrode of the first MOS transistor so as to permit a larger current to flow through the first MOS transistor than before feeding the second voltage thereto.

5. An image-sensing apparatus as claimed in claim 4, wherein the first, second, third and fourth MOS transistors are N-channel MOS transistors.

6. An image-sensing apparatus as claimed in claim 4, wherein the first, second, third and fourth MOS transistors are P-channel MOS transistors.

7. An image-sensing apparatus comprising:
a plurality of pixels, the pixels each including:
- a photosensitive element, having two electrodes, that produces an electric signal in accordance with amount of incident light;
- a first MOS transistor having a first electrode and a gate electrode connected to one electrode of the photosensitive element and a second electrode; and
- a second MOS transistor having a first electrode, a second electrode, and a gate electrode connected to the first and gate electrodes of the first MOS transistor;
- a third MOS transistor having a first electrode to which a direct-current voltage is applied, a second electrode, and a gate electrode connected to the second electrode of the second MOS transistor, the third MOS transistor amplifying a signal output from the second electrode of the second MOS transistor;
- a fourth MOS transistor having a first electrode connected to the second electrode of the third MOS transistor, a second electrode connected to an output signal line, and a gate electrode connected to a line select line;
- a capacitor having one end connected to the second electrode of the second MOS transistor; and
a controller that makes the individual pixels perform image sensing in such a way that the electric signal output from the photosensitive element is converted natural-logarithmically by feeding a first voltage to the second electrode of the first MOS transistor so as to make the first MOS transistor operate in a subthreshold region below a threshold value thereof,
wherein the controller resets the individual pixels by, in each pixel, feeding a second voltage to the second electrode of the first MOS transistor so as to permit a larger current to flow through the first MOS transistor than before feeding the second voltage thereto.

8. An image-sensing apparatus as claimed in claim 7, further comprising:
load resistors or constant-current sources connected to the output signal line, a total number of the load resistors or constant-current sources being smaller than a total number of the pixels.

9. An image-sensing apparatus as claimed in claim 8, wherein the load resistors or constant-current sources each comprise a resistive transistor having a first electrode connected to the output signal line and a second electrode and a control electrode connected to a direct-current voltage.

10. An image-sensing apparatus as claimed in claim 9, wherein the third transistor is an N-channel MOS transistor, and
wherein a direct-current voltage applied to a first electrode of the third transistor is higher than the direct-current voltage applied to the second electrode of the resistive transistor.

11. An image-sensing apparatus as claimed in claim 9, wherein the amplifying transistor is a P-channel MOS transistor; and
wherein a direct-current voltage applied to a first electrode of the amplifying transistor is lower than the direct-current voltage applied to the second electrode of the resistive transistor.

* * * * *

UNITED STATES PATENT AND TRADEMARK OFFICE
CERTIFICATE OF CORRECTION

PATENT NO. : 6,999,122 B1
DATED : February 14, 2006
INVENTOR(S) : Kenji Takada

It is certified that error appears in the above-identified patent and that said Letters Patent is hereby corrected as shown below:

<u>Title Page,</u>
Item [75], Inventors, delete "Yoshio Hagihara, Amagasaki (JP); Kenji Takada, Itami (JP)" and insert -- Kenji Takada, Itami (JP) --.

Signed and Sealed this

Thirteenth Day of June, 2006

JON W. DUDAS
*Director of the United States Patent and Trademark Office*